United States Patent
Hybertson

(10) Patent No.: US 10,050,945 B2
(45) Date of Patent: *Aug. 14, 2018

(54) APPARATUS AND METHODS FOR CONTENT TRANSFER PROTECTION

(71) Applicant: Time Warner Cable Enterprises LLC, New York, NY (US)

(72) Inventor: Eric Hybertson, Longmont, CO (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,880

(22) Filed: Feb. 6, 2017

(65) Prior Publication Data

US 2017/0214666 A1 Jul. 27, 2017

Related U.S. Application Data

(63) Continuation of application No. 13/710,308, filed on Dec. 10, 2012, now Pat. No. 9,565,472.

(51) Int. Cl.
*H04L 29/06* (2006.01)
*H04N 21/4408* (2011.01)
(Continued)

(52) U.S. Cl.
CPC ...... *H04L 63/0464* (2013.01); *H04L 63/0281* (2013.01); *H04L 63/04* (2013.01);
(Continued)

(58) Field of Classification Search
CPC ....... H04L 63/0428; H04L 63/04; H04L 9/06; H04L 2209/603; H04L 63/0464;
(Continued)

(56) References Cited

U.S. PATENT DOCUMENTS 5,369,707 A 11/1994 Follendore, III
5,528,284 A 6/1996 Iwami et al.
(Continued)

FOREIGN PATENT DOCUMENTS

EP 1139198 A2 10/2001
EP 2113860 A1 11/2009
(Continued)

OTHER PUBLICATIONS

5C Digital Transmission Content Protection White Paper, Hitachi, Ltd., et al., dated Jul. 14, 1998, 15 pages.
(Continued)

*Primary Examiner* — Robert Leung
*Assistant Examiner* — Ayoub Alata
(74) *Attorney, Agent, or Firm* — Gazdzinski & Associates, PC

(57) ABSTRACT

Methods and apparatus for ensuring protection of transferred content. In one embodiment, content is transferred while enabling a network operator (e.g., MSO) to control and change rights and restrictions at any time, and irrespective of subsequent transfers. This is accomplished in one implementation by providing a premises device configured to receive content in a first encryption format and encodes using a first codec, with an ability to transcrypt and/or transcode the content into an encryption format and encoding format compatible with a device which requests the content therefrom (e.g., from PowerKey/MPEG-2 content to DRM/MPEG-4 content). The premises device uses the same content key to encrypt the content as is used by the requesting device to decrypt the content.

23 Claims, 14 Drawing Sheets

(51) Int. Cl.
*H04N 21/4402* (2011.01)
*H04L 9/06* (2006.01)

(52) U.S. Cl.
CPC ....... *H04L 63/061* (2013.01); *H04N 21/4402* (2013.01); *H04N 21/4408* (2013.01); *H04N 21/440218* (2013.01); *H04L 9/06* (2013.01); *H04L 63/0428* (2013.01); *H04L 2209/603* (2013.01)

(58) Field of Classification Search
CPC ............ H04L 63/0281; H04N 21/4408; H04N 21/4402; H04N 21/440218; H04N 21/4627
See application file for complete search history.

(56) References Cited

U.S. PATENT DOCUMENTS

| | | |
|---|---|---|
| 5,577,209 A | 11/1996 | Boyle et al. |
| 5,708,961 A | 1/1998 | Hylton et al. |
| 5,715,403 A | 2/1998 | Stefik |
| 5,787,172 A | 7/1998 | Arnold |
| 5,818,438 A | 10/1998 | Howe et al. |
| 5,828,832 A | 10/1998 | Holden et al. |
| 5,870,474 A | 2/1999 | Wasilewski et al. |
| 5,897,635 A | 4/1999 | Torres et al. |
| 5,982,412 A | 11/1999 | Nulty |
| 6,009,103 A | 12/1999 | Woundy |
| 6,148,400 A | 11/2000 | Arnold |
| 6,154,844 A | 11/2000 | Touboul et al. |
| 6,157,719 A | 12/2000 | Wasilewski et al. |
| 6,167,432 A | 12/2000 | Jiang |
| 6,167,521 A | 12/2000 | Smith et al. |
| 6,181,697 B1 | 1/2001 | Nurenberg et al. |
| 6,212,636 B1 | 4/2001 | Boyle et al. |
| 6,219,710 B1 | 4/2001 | Gray et al. |
| 6,233,341 B1 | 5/2001 | Riggins |
| 6,233,687 B1 | 5/2001 | White |
| 6,256,393 B1 | 7/2001 | Safadi et al. |
| 6,259,701 B1 | 7/2001 | Shur et al. |
| 6,266,421 B1 | 7/2001 | Domyo et al. |
| 6,456,716 B1 | 9/2002 | Arnold |
| 6,519,062 B1 | 2/2003 | Yoo |
| 6,523,696 B1 | 2/2003 | Saito et al. |
| 6,601,171 B1 | 7/2003 | Carter et al. |
| 6,640,145 B2 | 10/2003 | Hoffberg et al. |
| 6,657,991 B1 | 12/2003 | Akgun et al. |
| 6,694,145 B2 | 2/2004 | Riikonen et al. |
| 6,742,116 B1 | 5/2004 | Matsui et al. |
| 6,760,768 B2 | 7/2004 | Holden et al. |
| 6,782,475 B1 | 8/2004 | Sumner |
| 6,782,550 B1 | 8/2004 | Cao |
| 6,785,810 B1 | 8/2004 | Lirov et al. |
| 6,788,676 B2 | 9/2004 | Partanen et al. |
| 6,807,573 B2 | 10/2004 | Saito et al. |
| 6,813,505 B2 | 11/2004 | Walley et al. |
| 6,859,535 B1 | 2/2005 | Tatebayashi et al. |
| 6,898,708 B2 | 5/2005 | Hori et al. |
| 6,910,064 B1 | 6/2005 | Astarabadi et al. |
| 6,925,257 B2 | 8/2005 | Yoo |
| 6,944,150 B1 | 9/2005 | McConnell et al. |
| 6,948,183 B1 | 9/2005 | Peterka |
| 6,954,632 B2 | 10/2005 | Kobayashi |
| 6,957,261 B2 | 10/2005 | Lortz |
| 6,957,328 B2 | 10/2005 | Goodman et al. |
| 6,973,576 B2 | 12/2005 | Giobbi |
| 6,975,730 B1 | 12/2005 | Kuroiwa et al. |
| 6,985,355 B2 | 1/2006 | Allirot |
| 6,996,544 B2 | 2/2006 | Sellars et al. |
| 7,006,881 B1 | 2/2006 | Hoffberg et al. |
| 7,007,170 B2 | 2/2006 | Morten |
| 7,009,972 B2 | 3/2006 | Maher et al. |
| 7,016,963 B1 | 3/2006 | Judd et al. |
| 7,017,189 B1 | 3/2006 | DeMello et al. |
| 7,027,460 B2 | 4/2006 | Iyer et al. |
| 7,039,048 B1 | 5/2006 | Monta et al. |
| 7,054,443 B1 | 5/2006 | Jakubowski et al. |
| 7,054,902 B2 | 5/2006 | Toporek et al. |
| 7,055,040 B2 | 5/2006 | Klemba et al. |
| 7,065,216 B1 | 6/2006 | Benaloh et al. |
| 7,068,639 B1 | 6/2006 | Varma et al. |
| 7,069,449 B2 | 6/2006 | Weaver et al. |
| 7,069,578 B1 | 6/2006 | Prus et al. |
| 7,072,950 B2 | 7/2006 | Toft |
| 7,073,199 B1 | 7/2006 | Raley |
| 7,092,397 B1 | 8/2006 | Chandran et al. |
| 7,099,308 B2 | 8/2006 | Merrill et al. |
| 7,103,181 B2 | 9/2006 | Ananth |
| 7,106,382 B2 | 9/2006 | Shiotsu |
| 7,107,326 B1 | 9/2006 | Fijolek et al. |
| 7,149,772 B1 | 12/2006 | Kalavade |
| 7,154,912 B2 | 12/2006 | Chong et al. |
| 7,165,268 B1 | 1/2007 | Moore et al. |
| 7,174,126 B2 | 2/2007 | McElhatten et al. |
| 7,174,127 B2 | 2/2007 | Otten et al. |
| 7,174,371 B2 | 2/2007 | Elo et al. |
| 7,174,385 B2 | 2/2007 | Li |
| 7,194,756 B2 | 3/2007 | Addington et al. |
| 7,209,458 B2 | 4/2007 | Ahvonen et al. |
| 7,225,333 B2 | 5/2007 | Peinado et al. |
| 7,228,427 B2 | 6/2007 | Fransdonk |
| 7,237,112 B1 | 6/2007 | Ishiguro et al. |
| 7,242,960 B2 | 7/2007 | Van et al. |
| 7,248,694 B2 | 7/2007 | Husemann et al. |
| 7,254,608 B2 | 8/2007 | Yeager et al. |
| 7,257,227 B2 | 8/2007 | Chen et al. |
| 7,266,726 B1 | 9/2007 | Ladd et al. |
| 7,289,534 B1 | 10/2007 | Bailey et al. |
| 7,299,502 B2 | 11/2007 | Schmeling et al. |
| 7,305,460 B2 | 12/2007 | Park |
| 7,313,611 B1 | 12/2007 | Jacobs et al. |
| 7,324,531 B2 | 1/2008 | Cho |
| 7,325,073 B2 | 1/2008 | Shao et al. |
| 7,330,483 B1 | 2/2008 | Peters, Jr. et al. |
| 7,330,967 B1 | 2/2008 | Pujare et al. |
| 7,353,543 B2 | 4/2008 | Ohmori et al. |
| 7,373,506 B2 | 5/2008 | Asano et al. |
| 7,376,386 B2 | 5/2008 | Phillips et al. |
| 7,376,976 B2 | 5/2008 | Fierstein et al. |
| 7,397,825 B2 | 7/2008 | Woodward, Jr. et al. |
| 7,409,546 B2 | 8/2008 | Platt |
| 7,457,520 B2 | 11/2008 | Rosetti et al. |
| 7,472,280 B2 | 12/2008 | Giobbi |
| 7,486,869 B2 | 2/2009 | Alexander et al. |
| 7,487,363 B2 | 2/2009 | Alve et al. |
| 7,506,367 B1 | 3/2009 | Ishibashi |
| 7,592,912 B2 | 9/2009 | Hasek et al. |
| 7,602,820 B2 | 10/2009 | Helms et al. |
| 7,673,004 B1 | 3/2010 | Sherstinsky et al. |
| 7,690,020 B2 | 3/2010 | Lebar |
| 7,693,171 B2 | 4/2010 | Gould |
| 7,707,644 B2 | 4/2010 | Choi et al. |
| 7,721,314 B2 | 5/2010 | Sincaglia et al. |
| 7,730,321 B2 | 6/2010 | Gasparini et al. |
| 7,742,074 B2 | 6/2010 | Minatogawa |
| 7,752,617 B2 | 7/2010 | Blinick et al. |
| 7,757,101 B2 | 7/2010 | Nonaka et al. |
| 7,783,891 B2 | 8/2010 | Perlin et al. |
| 7,809,942 B2 | 10/2010 | Baran et al. |
| 7,865,440 B2 | 1/2011 | Jaquette |
| 7,870,599 B2 | 1/2011 | Pemmaraju |
| 7,925,592 B1 | 4/2011 | Issa et al. |
| 7,930,558 B2 | 4/2011 | Hori |
| 7,954,131 B2 | 5/2011 | Cholas et al. |
| 7,983,418 B2 | 7/2011 | Oyama et al. |
| 8,166,508 B2 | 4/2012 | Mitsuji et al. |
| 8,181,262 B2 | 5/2012 | Cooper et al. |
| 8,234,387 B2 | 7/2012 | Bradley et al. |
| 8,280,982 B2 | 10/2012 | La et al. |
| 8,332,370 B2 | 12/2012 | Gattegno et al. |
| 8,332,657 B1 | 12/2012 | Eskicioglu et al. |
| 8,341,242 B2 | 12/2012 | Dillon et al. |
| 8,472,627 B2 | 6/2013 | Denning et al. |
| 8,520,850 B2 | 8/2013 | Helms et al. |

(56) References Cited

U.S. PATENT DOCUMENTS

| | | |
|---|---|---|
| 8,761,402 B2 | 6/2014 | McAvoy et al. |
| 9,215,423 B2 | 12/2015 | Kimble et al. |
| 9,300,919 B2 | 3/2016 | Cholas et al. |
| 9,706,160 B2 | 7/2017 | Marsh et al. |
| 2001/0004768 A1 | 6/2001 | Hodge et al. |
| 2001/0014946 A1 | 8/2001 | Ichinoi et al. |
| 2001/0019614 A1 | 9/2001 | Madoukh et al. |
| 2001/0029581 A1 | 10/2001 | Knauft |
| 2001/0053223 A1 | 12/2001 | Ishibashi et al. |
| 2001/0053226 A1 | 12/2001 | Akins et al. |
| 2001/0056541 A1 | 12/2001 | Matsuzaki et al. |
| 2002/0013772 A1 | 1/2002 | Peinado |
| 2002/0026575 A1 | 2/2002 | Wheeler et al. |
| 2002/0027883 A1 | 3/2002 | Belaiche |
| 2002/0032754 A1 | 3/2002 | Logston et al. |
| 2002/0048367 A1 | 4/2002 | Maillard |
| 2002/0056125 A1 | 5/2002 | Hodge et al. |
| 2002/0059619 A1 | 5/2002 | Lebar |
| 2002/0062440 A1 | 5/2002 | Akama |
| 2002/0066033 A1 | 5/2002 | Dobbins et al. |
| 2002/0077984 A1 | 6/2002 | Ireton |
| 2002/0126654 A1 | 9/2002 | Preston et al. |
| 2002/0129358 A1 | 9/2002 | Buehl et al. |
| 2002/0144067 A1 | 10/2002 | Jeong |
| 2002/0147771 A1 | 10/2002 | Traversat et al. |
| 2002/0152299 A1 | 10/2002 | Traversat et al. |
| 2002/0152393 A1 | 10/2002 | Thoma et al. |
| 2002/0183985 A1 | 12/2002 | Hori et al. |
| 2002/0184154 A1 | 12/2002 | Hori et al. |
| 2002/0188744 A1 | 12/2002 | Mani |
| 2002/0188869 A1 | 12/2002 | Patrick |
| 2002/0199105 A1 | 12/2002 | Ishiguro et al. |
| 2003/0009681 A1 | 1/2003 | Harada et al. |
| 2003/0021421 A1 | 1/2003 | Yokota et al. |
| 2003/0041336 A1 | 2/2003 | Del et al. |
| 2003/0046560 A1 | 3/2003 | Inomata et al. |
| 2003/0048380 A1 | 3/2003 | Tamura |
| 2003/0056217 A1 | 3/2003 | Brooks |
| 2003/0069965 A1 | 4/2003 | Ma et al. |
| 2003/0074571 A1 | 4/2003 | Fujiwara et al. |
| 2003/0084003 A1 | 5/2003 | Pinkas et al. |
| 2003/0097340 A1 | 5/2003 | Okamoto et al. |
| 2003/0115267 A1 | 6/2003 | Hinton et al. |
| 2003/0140227 A1 | 7/2003 | Asano et al. |
| 2003/0163697 A1 | 8/2003 | Pabla et al. |
| 2003/0163739 A1 | 8/2003 | Armington et al. |
| 2003/0165241 A1 | 9/2003 | Fransdonk |
| 2003/0166401 A1 | 9/2003 | Combes et al. |
| 2003/0174838 A1 | 9/2003 | Bremer |
| 2003/0187799 A1 | 10/2003 | Sellars et al. |
| 2003/0205763 A1 | 11/2003 | Park et al. |
| 2003/0208763 A1 | 11/2003 | McElhatten et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0024688 A1 | 2/2004 | Bi et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0052377 A1 | 3/2004 | Mattox et al. |
| 2004/0078602 A1 | 4/2004 | Rothbarth et al. |
| 2004/0088558 A1 | 5/2004 | Candelore |
| 2004/0109569 A1 | 6/2004 | Ellison et al. |
| 2004/0117836 A1 | 6/2004 | Karaoguz et al. |
| 2004/0123129 A1 | 6/2004 | Ginter et al. |
| 2004/0128499 A1 | 7/2004 | Peterka et al. |
| 2004/0133923 A1 | 7/2004 | Watson et al. |
| 2004/0137918 A1 | 7/2004 | Varonen et al. |
| 2004/0177369 A1 | 9/2004 | Akins |
| 2004/0181800 A1 | 9/2004 | Rakib et al. |
| 2004/0184616 A1 | 9/2004 | Morten |
| 2004/0190721 A1 | 9/2004 | Barrett et al. |
| 2004/0193609 A1 | 9/2004 | Phan et al. |
| 2004/0193680 A1 | 9/2004 | Gibbs et al. |
| 2004/0224425 A1 | 11/2004 | Gjerde et al. |
| 2004/0237100 A1 | 11/2004 | Pinder et al. |
| 2004/0250273 A1 | 12/2004 | Swix et al. |
| 2004/0260798 A1 | 12/2004 | Addington et al. |
| 2004/0261093 A1 | 12/2004 | Rebaud et al. |
| 2004/0268386 A1 | 12/2004 | Logan et al. |
| 2005/0005287 A1 | 1/2005 | Claussen |
| 2005/0015810 A1 | 1/2005 | Gould et al. |
| 2005/0021985 A1 | 1/2005 | Ono et al. |
| 2005/0022227 A1 | 1/2005 | Shen et al. |
| 2005/0034171 A1 | 2/2005 | Benya |
| 2005/0039212 A1 | 2/2005 | Baran et al. |
| 2005/0049886 A1 | 3/2005 | Grannan et al. |
| 2005/0055220 A1 | 3/2005 | Lee et al. |
| 2005/0065888 A1 | 3/2005 | Benaloh |
| 2005/0086683 A1 | 4/2005 | Meyerson |
| 2005/0091173 A1 | 4/2005 | Alve |
| 2005/0097006 A1 | 5/2005 | Nyako |
| 2005/0108763 A1 | 5/2005 | Baran et al. |
| 2005/0114686 A1 | 5/2005 | Ball et al. |
| 2005/0114900 A1 | 5/2005 | Ladd et al. |
| 2005/0138357 A1 | 6/2005 | Swenson et al. |
| 2005/0169468 A1 | 8/2005 | Fahrny et al. |
| 2005/0172127 A1* | 8/2005 | Hartung ............... H04L 51/066 713/167 |
| 2005/0177740 A1 | 8/2005 | Athaide et al. |
| 2005/0177741 A1 | 8/2005 | Chen et al. |
| 2005/0177855 A1 | 8/2005 | Maynard et al. |
| 2005/0182931 A1 | 8/2005 | Robert et al. |
| 2005/0188210 A1 | 8/2005 | Perlin et al. |
| 2005/0190912 A1 | 9/2005 | Hopkins et al. |
| 2005/0195975 A1 | 9/2005 | Kawakita |
| 2005/0198693 A1 | 9/2005 | Choi et al. |
| 2005/0210500 A1 | 9/2005 | Stone |
| 2005/0268107 A1 | 12/2005 | Harris et al. |
| 2005/0273629 A1 | 12/2005 | Abrams et al. |
| 2005/0278259 A1 | 12/2005 | Gunaseelan et al. |
| 2005/0289618 A1 | 12/2005 | Hardin |
| 2006/0002551 A1 | 1/2006 | Brown et al. |
| 2006/0004662 A1 | 1/2006 | Nadalin et al. |
| 2006/0008256 A1 | 1/2006 | Khedouri et al. |
| 2006/0015352 A1 | 1/2006 | Wynn et al. |
| 2006/0020786 A1 | 1/2006 | Helms et al. |
| 2006/0020950 A1 | 1/2006 | Ladd et al. |
| 2006/0021004 A1 | 1/2006 | Moran et al. |
| 2006/0036750 A1 | 2/2006 | Ladd et al. |
| 2006/0041903 A1 | 2/2006 | Kahn et al. |
| 2006/0041905 A1 | 2/2006 | Wasilewski |
| 2006/0047801 A1 | 3/2006 | Haag et al. |
| 2006/0047957 A1 | 3/2006 | Helms et al. |
| 2006/0064583 A1 | 3/2006 | Birnbaum et al. |
| 2006/0095940 A1 | 5/2006 | Yearwood |
| 2006/0130099 A1 | 6/2006 | Rooyen |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0137005 A1 | 6/2006 | Park |
| 2006/0137015 A1 | 6/2006 | Fahrny et al. |
| 2006/0148362 A1 | 7/2006 | Bridges |
| 2006/0149850 A1 | 7/2006 | Bowman |
| 2006/0161635 A1 | 7/2006 | Lamkin et al. |
| 2006/0168219 A1 | 7/2006 | Ahluwalia et al. |
| 2006/0179138 A1 | 8/2006 | Van et al. |
| 2006/0184972 A1 | 8/2006 | Rafey et al. |
| 2006/0187900 A1 | 8/2006 | Akbar |
| 2006/0200856 A1 | 9/2006 | Salowey et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0218604 A1 | 9/2006 | Riedl et al. |
| 2006/0218647 A1 | 9/2006 | Hars et al. |
| 2006/0236131 A1 | 10/2006 | Vauclair |
| 2006/0248553 A1 | 11/2006 | Mikkelson et al. |
| 2006/0259927 A1 | 11/2006 | Acharya et al. |
| 2006/0291506 A1 | 12/2006 | Cain |
| 2007/0011335 A1 | 1/2007 | Burns et al. |
| 2007/0019645 A1 | 1/2007 | Menon |
| 2007/0022459 A1 | 1/2007 | Gaebel, Jr. et al. |
| 2007/0022469 A1 | 1/2007 | Cooper et al. |

(56) References Cited

U.S. PATENT DOCUMENTS

| | | |
|---|---|---|
| 2007/0033531 A1 | 2/2007 | Marsh |
| 2007/0046791 A1 | 3/2007 | Wang et al. |
| 2007/0049245 A1 | 3/2007 | Lipman |
| 2007/0067851 A1 | 3/2007 | Fernando et al. |
| 2007/0079381 A1 | 4/2007 | Hartung et al. |
| 2007/0094691 A1 | 4/2007 | Gazdzinski |
| 2007/0098178 A1 | 5/2007 | Raikar |
| 2007/0104456 A1 | 5/2007 | Craner |
| 2007/0121678 A1 | 5/2007 | Brooks et al. |
| 2007/0124488 A1 | 5/2007 | Baum et al. |
| 2007/0124602 A1 | 5/2007 | Wald et al. |
| 2007/0157295 A1 | 7/2007 | Mangalore et al. |
| 2007/0174888 A1 | 7/2007 | Rubinstein |
| 2007/0192615 A1 | 8/2007 | Varghese et al. |
| 2007/0204314 A1 | 8/2007 | Hasek et al. |
| 2007/0206799 A1 | 9/2007 | Wingert et al. |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0220024 A1 | 9/2007 | Putterman et al. |
| 2007/0250872 A1 | 10/2007 | Dua |
| 2007/0250880 A1 | 10/2007 | Hainline |
| 2007/0261116 A1 | 11/2007 | Prafullchandra et al. |
| 2007/0276925 A1 | 11/2007 | La et al. |
| 2007/0276926 A1 | 11/2007 | Lajoie et al. |
| 2007/0294178 A1 | 12/2007 | Pinder et al. |
| 2008/0008321 A1 | 1/2008 | Gagnon et al. |
| 2008/0008371 A1 | 1/2008 | Woods et al. |
| 2008/0021836 A1 | 1/2008 | Lao |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0103976 A1 | 5/2008 | Read et al. |
| 2008/0103977 A1 | 5/2008 | Khosravy et al. |
| 2008/0112405 A1 | 5/2008 | Cholas et al. |
| 2008/0117920 A1 | 5/2008 | Tucker |
| 2008/0123862 A1 | 5/2008 | Rowley |
| 2008/0133551 A1 | 6/2008 | Wensley et al. |
| 2008/0141353 A1 | 6/2008 | Brown |
| 2008/0148362 A1 | 6/2008 | Gilder et al. |
| 2008/0154626 A1 | 6/2008 | Gounares et al. |
| 2008/0155059 A1 | 6/2008 | Hardin et al. |
| 2008/0162353 A1 | 7/2008 | Tom et al. |
| 2008/0165460 A1 | 7/2008 | Whitby-Strevens |
| 2008/0177998 A1 | 7/2008 | Apsangi et al. |
| 2008/0212945 A1 | 9/2008 | Khedouri et al. |
| 2008/0222684 A1 | 9/2008 | Mukraj et al. |
| 2008/0235746 A1 | 9/2008 | Peters et al. |
| 2008/0256510 A1 | 10/2008 | Auerbach |
| 2008/0270307 A1 | 10/2008 | Olson et al. |
| 2008/0273591 A1 | 11/2008 | Brooks et al. |
| 2008/0282299 A1 | 11/2008 | Koat et al. |
| 2008/0288618 A1 | 11/2008 | Vardi et al. |
| 2009/0007234 A1 | 1/2009 | Birger et al. |
| 2009/0025075 A1 | 1/2009 | Chow et al. |
| 2009/0031371 A1 | 1/2009 | Munsell et al. |
| 2009/0083813 A1 | 3/2009 | Dolce et al. |
| 2009/0098861 A1 | 4/2009 | Kalliola et al. |
| 2009/0100459 A1 | 4/2009 | Riedl et al. |
| 2009/0102983 A1 | 4/2009 | Malone et al. |
| 2009/0151006 A1 | 6/2009 | Saeki et al. |
| 2009/0182815 A1 | 7/2009 | Czechowski, III et al. |
| 2009/0185576 A1 | 7/2009 | Kisel et al. |
| 2009/0201917 A1 | 8/2009 | Maes et al. |
| 2009/0210912 A1 | 8/2009 | Cholas et al. |
| 2009/0220216 A1* | 9/2009 | Marsh ............... H04L 12/6418 386/292 |
| 2009/0225760 A1 | 9/2009 | Foti |
| 2009/0265750 A1 | 10/2009 | Jones et al. |
| 2009/0282241 A1 | 11/2009 | Prafullchandra et al. |
| 2009/0282449 A1 | 11/2009 | Lee |
| 2009/0290711 A1 | 11/2009 | Bloom et al. |
| 2009/0292922 A1 | 11/2009 | Park |
| 2009/0293101 A1 | 11/2009 | Carter et al. |
| 2010/0017627 A1 | 1/2010 | Princen et al. |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0082983 A1 | 4/2010 | Shah et al. |
| 2010/0083329 A1 | 4/2010 | Joyce et al. |
| 2010/0088236 A1 | 4/2010 | Karabulut et al. |
| 2010/0088292 A1 | 4/2010 | Tirpak et al. |
| 2010/0106846 A1 | 4/2010 | Noldus et al. |
| 2010/0131973 A1 | 5/2010 | Dillon et al. |
| 2010/0138900 A1 | 6/2010 | Peterka et al. |
| 2010/0169977 A1 | 7/2010 | Dasher et al. |
| 2010/0185855 A1 | 7/2010 | Margolus et al. |
| 2010/0198888 A1 | 8/2010 | Blomstedt et al. |
| 2010/0217837 A1 | 8/2010 | Ansari et al. |
| 2010/0251304 A1 | 9/2010 | Donoghue et al. |
| 2010/0287609 A1 | 11/2010 | Gonzalez et al. |
| 2010/0310076 A1 | 12/2010 | Barzilai et al. |
| 2010/0313225 A1 | 12/2010 | Cholas et al. |
| 2010/0313226 A1* | 12/2010 | Cholas ............... H04N 7/17318 725/92 |
| 2011/0071841 A1 | 3/2011 | Fomenko et al. |
| 2011/0078721 A1 | 3/2011 | Wang et al. |
| 2011/0093900 A1 | 4/2011 | Patel et al. |
| 2011/0103374 A1 | 5/2011 | Lajoie et al. |
| 2011/0164753 A1 | 7/2011 | Dubhashi et al. |
| 2011/0179196 A1 | 7/2011 | Friedman |
| 2011/0197070 A1 | 8/2011 | Mizrah |
| 2011/0213688 A1 | 9/2011 | Santos et al. |
| 2011/0219229 A1 | 9/2011 | Cholas et al. |
| 2011/0252236 A1 | 10/2011 | De et al. |
| 2011/0252243 A1 | 10/2011 | Brouwer et al. |
| 2012/0008786 A1 | 1/2012 | Cronk et al. |
| 2012/0011567 A1 | 1/2012 | Cronk et al. |
| 2012/0030714 A1 | 2/2012 | Sweatt, III et al. |
| 2012/0089699 A1 | 4/2012 | Cholas |
| 2012/0131629 A1 | 5/2012 | Shrum, Jr. et al. |
| 2012/0159603 A1 | 6/2012 | Queck |
| 2012/0167173 A1 | 6/2012 | Nadalin et al. |
| 2012/0260346 A1 | 10/2012 | Carey et al. |
| 2012/0291062 A1 | 11/2012 | Pearson et al. |
| 2013/0191443 A1 | 7/2013 | Gan et al. |
| 2013/0309971 A1 | 11/2013 | Kiukkonen et al. |
| 2013/0318629 A1 | 11/2013 | Lajoie et al. |
| 2013/0347089 A1 | 12/2013 | Bailey et al. |
| 2014/0233923 A1 | 8/2014 | Bradley et al. |
| 2014/0281489 A1 | 9/2014 | Peterka et al. |
| 2014/0282750 A1 | 9/2014 | Civiletto |
| 2014/0283137 A1 | 9/2014 | Rebaud et al. |
| 2016/0165650 A1 | 6/2016 | Kim et al. |
| 2016/0165651 A1 | 6/2016 | Pathuri et al. |
| 2016/0301525 A1 | 10/2016 | Canard et al. |

FOREIGN PATENT DOCUMENTS

| | | |
|---|---|---|
| GB | 2381709 A | 5/2003 |
| JP | H08263440 A | 10/1996 |
| JP | 2000156676 A | 6/2000 |
| JP | 2000332746 A | 11/2000 |
| JP | 2001243707 A | 9/2001 |
| JP | 2001274786 A | 10/2001 |
| JP | 2001274788 A | 10/2001 |
| JP | 2001285821 A | 10/2001 |
| JP | 2002163396 A | 6/2002 |
| JP | 2002352094 A | 12/2002 |
| JP | 2003058657 A | 2/2003 |
| JP | 2003162600 A | 6/2003 |
| JP | 2003233690 A | 8/2003 |
| JP | 2003248508 A | 9/2003 |
| JP | 2003296484 A | 10/2003 |
| JP | 2003348508 A | 12/2003 |
| JP | 2004030111 A | 1/2004 |
| JP | 2004072721 A | 3/2004 |
| JP | 2004120736 A | 4/2004 |
| JP | 2004120738 A | 4/2004 |
| JP | 2004303111 A | 10/2004 |
| JP | 2005506627 A | 3/2005 |

(56) References Cited

FOREIGN PATENT DOCUMENTS

| | | | |
|---|---|---|---|
| JP | 2005519365 A | 6/2005 |
| JP | 2005519501 A | 6/2005 |
| JP | 2005339093 A | 12/2005 |
| JP | 2006185473 A | 7/2006 |
| JP | 2006311267 A | 11/2006 |
| JP | 2007020144 A | 1/2007 |
| JP | 2007534030 A | 11/2007 |
| JP | 2007336553 A | 12/2007 |
| JP | 2008005047 A | 1/2008 |
| JP | 2008015936 A | 1/2008 |
| JP | 2008021293 A | 1/2008 |
| JP | 2008507905 A | 3/2008 |
| JP | 2008167018 A | 7/2008 |
| JP | 2008186272 A | 8/2008 |
| JP | 2008206039 A | 9/2008 |
| JP | 2008539631 A | 11/2008 |
| JP | 2009071786 A | 4/2009 |
| JP | 2009515238 A | 4/2009 |
| JP | 2009176060 A | 8/2009 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO-0103410 A1 | 1/2001 |
| WO | WO-0110125 A1 | 2/2001 |
| WO | WO-0137479 A1 | 5/2001 |
| WO | WO-0169842 A1 | 9/2001 |
| WO | WO-0177778 A2 | 10/2001 |
| WO | WO-0213032 A1 | 2/2002 |
| WO | WO-0221841 A1 | 3/2002 |
| WO | WO-0242966 A1 | 5/2002 |
| WO | WO-02080556 A1 | 10/2002 |
| WO | WO-03038704 A1 | 5/2003 |
| WO | WO-03087799 A1 | 10/2003 |
| WO | WO-03093944 A2 | 11/2003 |
| WO | WO-2004027622 A2 | 4/2004 |
| WO | WO-2005015422 A1 | 2/2005 |
| WO | WO-2006020141 A2 | 2/2006 |
| WO | WO-2008070062 A2 | 6/2008 |
| WO | WO-2008080556 A1 | 7/2008 |
| WO | WO-2009020476 A2 | 2/2009 |
| WO | WO-2012021245 A1 | 2/2012 |

OTHER PUBLICATIONS

Cantor, et al., Bindings for the OASIS Security Assertion Markup Language (SAML) V2.0, OASIS Standard, Mar. 2005 (http://docs.oasis-open.org/security/saml/v2.0/).

DCAS Authorized Service Domain, Version 1.2, dated Nov. 30, 2005, 54 pages.

DCAS Licensed Specification Abstracts, CableLabs Confidential Information, Jan. 12, 2006, 4 pages.

Digital Video Broadcasting (DVB); DVB SimulCrypt; Part 1: "Head-end architecture and synchronization" Technical Specification—ETSI TS 101 197 V1.2.1 (Feb. 2002), 40 pages.

DVB (Digital Video Broadcasting), DVB Document A045 Rev. 3, Jul. 2004, "Head-end Implementation of SimulCrypt," 289 pages.

Federal Information Processing Standards Publication, US FIPS PUB 197, Nov. 26, 2001, "Advanced Encryption Standards (AES)," 47 pages.

High-bandwidth Digital Content Protection System, Revision 1.091, dated Apr. 22, 2003, Digital Content Protection LLC Draft, 78 pages.

Marusic, et al., "Share it!—Content Transfer in Home-to-Home Networks." IEEE MELECON 2004, May 12-15, 2004; Dubrovnik, Croatia.

Media Server; 1 Device Template Version 1.01 Jun. 25, 2002.

OpenCable Application Platform Specification, OCAP 2.0 Profile, OC-SP-OCAP2.0-I01-020419, Apr. 19, 2002.

OpenCable Application Platform Specifications, OCAP Extensions, OC-SP-OCAP—HNEXT-I03-080418, 2005-2008.

OpenCable Host Device, Core Functional Requirements, OC-SP-HOST-CFR-I13-030707, Jul. 7, 2003.

OpenCable, HOST-POD Interface Specification, OC-SP-HOSTPOD-IF-113-030707, Jul. 7, 2003.

OpenCable Specification, Home Networking Protocol 2.0, OC-SP-HNP2.0-I01-08418, 2007.

OpenCable Specifications, Home Networking Security Specification, OC-SP-HN-SEC-DO1-081027, draft (Oct. 27, 2008).

Van Moffaert, K., et al. ("Digital Rights Management: DPM is a key enabler for the future growth of the broadband access market and the telecom/networking market in general", Alcatel Telecommunications Review, Alcatel, Paris Cedex FR, Apr. 1, 2003, XP007005930ISSN; 8 pages.

Zhang, et al., A Flexible Content Protection System for Media-on-Demand, ISM China Research Lab, Proceedings of the IEEE Fourth International Symposium on Multimedia Software Engineering (MSE'02), 6 pages.

Cantor, et al., Assertions and Protocols for the OASIS Security Assertion Markup Language (SAML) V2.0, OASIS Standard, Mar. 15, 2005. Document ID: saml-core-2.0-os (http://docs.oasis-open.org/securit/saml/v2.0/saml-core-2.0-os.pdf).

Primergy BX300 Switch Blade user's manual, Fujitsu Corp., Sep. 30, 2002, first edition, pp. 1 to 20.

RealSystem Media Commerce Suite Technical White Paper, .Copyrgt, 2001 RealNetworks, Inc., http://www.realnetworks.com, 16 pages.

DCAS Authorized Service Domain, Version 1.2, Nov. 30, 2005, 56 pages.

Real System Media Commerce Suite Technical White Paper, Copyright 2011, Real Networks, Inc., 16 pages, (http://www.realnetworkis).

* cited by examiner

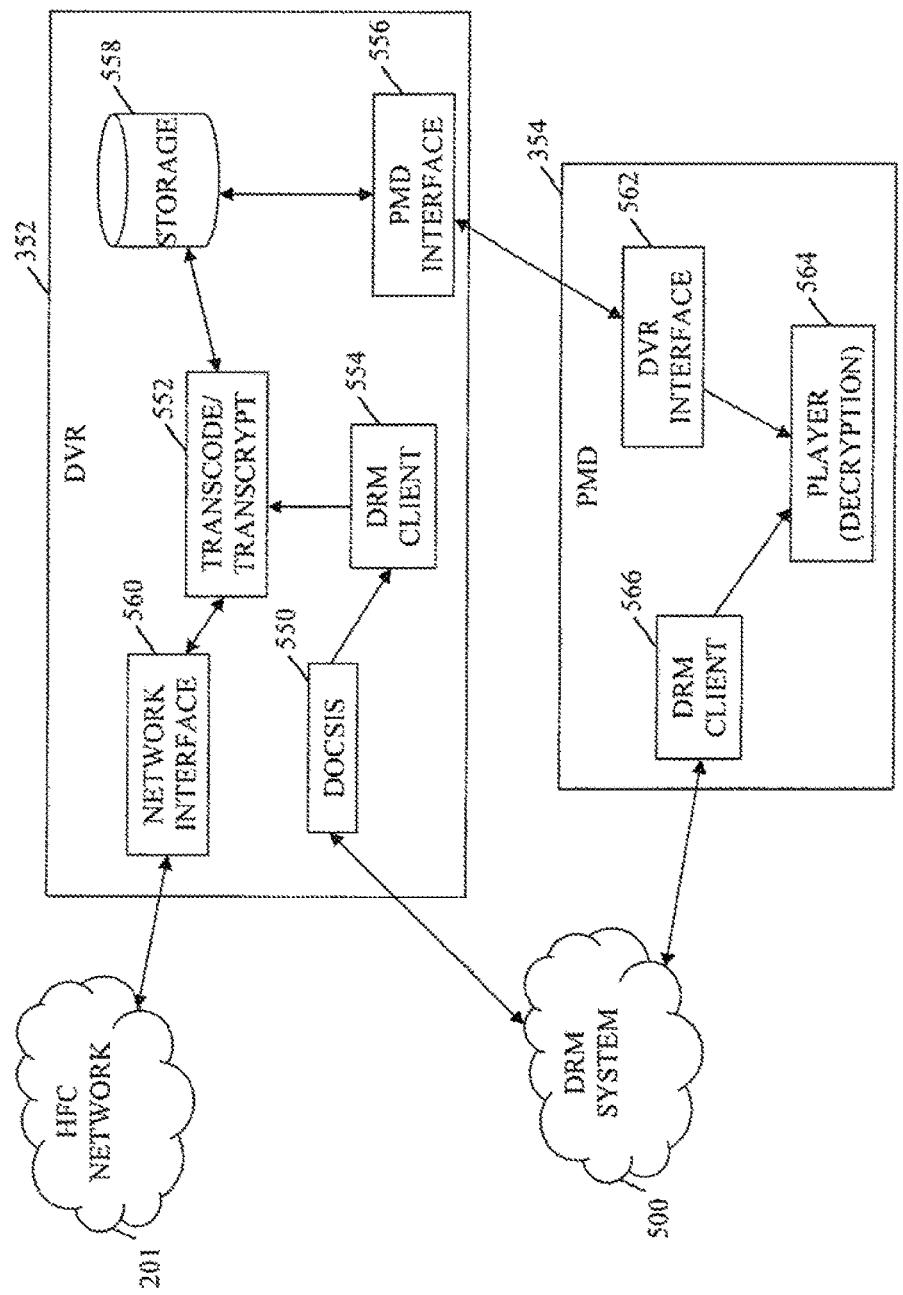

US 10,050,945 B2

APPARATUS AND METHODS FOR CONTENT TRANSFER PROTECTION

PRIORITY AND RELATED APPLICATIONS

This application is a continuation of and claims priority to U.S. patent application Ser. No. 13/710,308 filed on Dec. 10, 2012 of the same title, issuing on Feb. 7, 2017 as U.S. Pat. No. 9,565,472, which is incorporated herein by reference in its entirety. Additionally, the present application is related to commonly owned U.S. patent application Ser. No. 11/584,208 filed on Oct. 20, 2006 and entitled "Downloadable Security and Protection Methods and Apparatus", now issued as U.S. Pat. No. 8,520,850, commonly owned U.S. patent application Ser. No. 11/657,828 filed on Jan. 24, 2007 and entitled "Apparatus and Methods for Provisioning in a Download-Enabled System", now issued as U.S. Pat. No. 8,621,540, commonly owned U.S. patent application Ser. No. 12/480,597 filed Jun. 8, 2009 and entitled "Media Bridge Apparatus and Methods", now published as U.S. Patent Application Publication No. 2010/0313225, and commonly owned U.S. patent application Ser. No. 12/834,801 filed on Jan. 12, 2010 and entitled "Apparatus and Methods for Content Management and Account Linking Across Multiple Content Delivery Networks", now published as U.S. Patent Application Publication No. 2012/0008786, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technology Field

The disclosure relates generally to the field of data and content distribution and delivery via a content distribution or other network. In one exemplary aspect, the disclosure relates to the delivery or transfer of content in a protected manner.

2. Description of Related Technology

A wide range of services and functions including e.g., digital programming (movies, etc.), digital video-on-demand (VOD), personal video recorder (PVR), Internet Protocol television (IPTV), digital media playback and recording, as well high-speed Internet access and IP-based telephony (e.g., VoIP), etc. are available for delivery to consumers at their premises for reasonable prices or subscription fees. Other services available to network users include access to and recording of digital music (e.g., MP3 files), as well local area networking (including wire-line and wireless local area networks or WLANs) for distributing these services throughout the user's premises, and beyond.

The foregoing services and functions may be provided to the user via a wide variety of different equipment environments including, inter alia, cable modems, Wi-Fi hubs, WMANs (such as e.g., WiMAX networks), Ethernet hubs, gateways, switches and routers, computers, servers, cable set-top boxes, public switched telephone networks (PSTNs), cellular telephones/smartphones (including e.g., LTE-enabled networks), tablet computers (including so-called "phablets"), and portable digital music devices. Additionally, the foregoing may be provided by one or more vendors or service providers including e.g., a cable service provider (e.g., MSO), cellular service provider (CSP), wireless service provider (WSP), VoIP service provider, music download service, Internet service provider (ISP), PSTN telephone service, etc., and/or content may be distributed between devices in any of the foregoing networks.

As the number of devices and providers increases, there is an increased need to provide integration across multiple delivery platforms and networks. Specifically, movement of content delivered by these services within the user's premises (and/or outside the premises, such as between networks) is often substantially frustrated, largely due to concerns relating to protection of valuable (e.g., copyrighted) content, and surreptitious reproduction and distribution thereof. Such unauthorized reproduction and distribution not only detracts from the network operator's revenue and commercial viability, but also that of the content source (e.g., movie studio, recording studio/artist, etc.).

Various methods have heretofore been employed by network operators in order to attempt to frustrate surreptitious access to, and copying and distribution of, valuable content. For example, conditional access (CA) technologies have been utilized for such purposes. Additionally, symmetric or asymmetric encryption technologies, such as those in accordance with the Data Encryption Standard (DES) technique or Advanced Encryption Standard (AES) may be used to secure content delivery. So-called "trusted domains" and digital rights management (DRM) solutions have also been utilized for this purpose. Each of these techniques is now described in greater detail.

Conditional Access

Conditional access (CA) technologies are typically incorporated into content-based networks, such technologies including the digital encoding of various types of data including audio and video programming and music. Conditional access can generally be defined as the control of when and how a user may view and use the associated programming or information. Different types of conditional access may be desirable in a network delivery system in order to, e.g., accommodate improvements in the technology over time, as well as different conditional access attributes such as security and category of programming or user access level.

A variety of traditional methods of conditional access exist including, e.g., "PowerKey", NDS, and DigiCipher. A generalized conditional access model is also provided by the well-known DVB (Digital Video Broadcasting) Specification TS 101 197 V1.2.1 (02/02), DVB SimulCrypt; Part 1: "Head-end architecture and synchronization", and TS 103 197 V1.2.1 (02/02): "Head-end Implementation of SimulCrypt", each incorporated herein by reference in its entirety.

FIG. 1a illustrates an exemplary prior art architecture 200 for providing content to a plurality of consumer premises equipment (CPE) via e.g., an HFC network using a conditional access scheme. Specifically, the network 100 distributes PowerKey protected content to the CPE. In order to access the content, each CPE utilizes the so-called "CableCard" plug-in security module access technology (also known as "a point-of-deployment (POD) module"). See, e.g., the CableCard-Host interface specification, which defines the interface between a digital cable receiver or STB (Host device) and the CableCard device provided by the MSO/cable operator. CableCard was developed to satisfy certain security requirements, and to allow retail availability of host devices, e.g., set-top boxes, digital cable ready televisions, DVRs, personal computers (PCs), integrated digital televisions, etc., for receiving cable services. The CableCard, comprising a PCMCIA device, can be inserted into a host device, allowing a viewer to receive cable systems' secure digital video services, e.g., pay-per-view (PPV) TV, electronic program guides, premium subscription channels, etc.

Specifically, the CableCard contains conditional access functionality, as well as the capability of converting messages to a common format. Thus, the CableCard provides a cable operator with a secure device at the subscriber premises, and acts as a translator so that the host device needs to understand a single protocol, regardless of the type of the network to which it is connected.

In FIG. 1a, the same PowerKey protected content (Content A) may therefore be sent to multiple CPE. Each CPE can then use its CableCard to access the content.

However, the requirement for a CableCard is comparatively tedious and expensive, especially given the recent trend toward home networking techniques which enable content transfer to and use on all of a user's devices (including personal computers, laptop and notebook computers, tablets, smartphones, etc.).

Moreover, the prior art PowerKey approach described above has no authentication entity or "proxy" that can authenticate CPE or other connected devices in anticipation of providing download services, no video (media) provisioning system, and hence by nature is highly localized.
"Trusted Domains"

Another related approach for content protection comprises the creation and enforcement of a "trusted domain" or TD. Specifically, such a trusted domain (TD) comprises an area (physically or virtually) within which programming or other content is protected from unauthorized access, distribution and copying. For example, in a cable network, a trusted domain may include not only the network portion where programming content traditionally is secured by, and within total control of, a cable operator (including, e.g., the headend, HFC delivery network, etc.,) but also user devices or CPE at subscribers' premises which are capable of receiving and securely storing programming content.

Using the trusted domain approach, the network operator can guarantee certain subscriber access, distribution, and usage policy enforcement with respect to content held within the domain. For example, a digital representation of a movie held within an operator's TD (e.g., on a hard drive of a user device) cannot be distributed over the Internet, wireless network, etc. in viewable form, and cannot become a source for duplication of multiple viewable copies.

Accordingly, a home network on which content may be transferred may be created; however, additional mechanisms are needed to ensure protection of the content within the trusted domain. One exemplary approach of implementing a trusted domain, described in co-owned U.S. Patent Application Publication No. 2006/0047957 filed Dec. 7, 2004 and entitled "Technique For Securely Communicating Programming Content", now issued as U.S. Pat. No. 8,312,267, which is incorporated herein by reference in its entirety, comprises using two cryptographic elements (e.g., encryption keys), associated with a user and his/her client device(s), respectively, that control access to content stored in the client device(s) within the domain. For example, the content stored in the client device may be encrypted using a private or secret key in accordance with the Data Encryption Standard (DES) or Advanced Encryption Standard (AES) algorithms. When the encrypted content is transported from the client device to another device within the domain associated with the same user (or other common parameter or feature), the second device needs the cryptographic element (e.g., the secret key) to decrypt the encrypted content. To that end, the second device also receives from the source device an encrypted version of this secret key. The latter is generated by encrypting the secret key using a second and distinct cryptographic element (e.g., a public key in accordance with a public key algorithm) associated with the subscriber. The second device provides the encrypted version of the secret key to a remote apparatus, e.g., in a headend, where the secret key is recovered based on at least the encrypted version of the secret key and data relating to that user or client device. The second device then receives from the head-end another encrypted version of the secret key, which is generated by encrypting the recovered secret key using a third cryptographic element (e.g., a public key in accordance with a public key algorithm) associated with the second device. Based on at least this second encrypted version of the secret key, the secret key can be recovered in the second device to decrypt the encrypted content.

However, generally speaking, any "trusted domains" that might be established are not extendable beyond the CPE on the client side of the delivery network.
Digital Rights Management (DRM)

Another approach used to control the distribution and use of protected content within a content-based network is to employ so-called digital rights management (DRM). For example, Media rights management systems such as the Microsoft Windows® Media Digital Rights Manager (DRM), may be used.

FIG. 1b illustrates an exemplary prior art network for transfer of content using DRM techniques. As shown, the network generally comprises a content server in communication with a plurality of client devices (CPE 1, CPE 2, etc.) via a hybrid fiber-coaxial (HFC) network.

First content, Content A-1 is provided to a first CPE (CPE 1), upon request therefor. The digital media or content is encrypted and locked with a "license key" that is particular to the requesting device (DRM License 1). The license key is stored in a license file or other data structure which is distributed separately from the media or content to the requesting device. A user can obtain the encrypted media file from a content server (such as by, e.g., receiving it in a broadcast, downloading it from a web site, purchasing it on a physical media, etc.). To play the digital media file, the user must acquire the license file including the license key for that media file from a DRM server. The user acquires the license key by accessing a pre-delivered license (which includes license terms or policies). Alternatively, when the user plays the file for the first time, a procedure is invoked for retrieving the license via a network connection or other delivery mode (e.g., the Internet). After obtaining the license with the license key, the user is able to access the media file according to the rules or rights specified in the license policies.

It is noted that, in FIG. 1b, the system operator (e.g., MSO) provides a means for encrypting the requested content with the device-specific license key to create the secured content file (Content A-1). The requesting CPE (CPE 1) will require the DRM license (DRM License 1) to access the content in the file as discussed above. In order to ensure that the requesting device and/or user is entitled to access the content, an association or data record is generated and maintained at a database at the network headend. Upon request for the DRM license, the DRM server determines whether the user/device is entitled to access prior to providing the DRM license thereto.

The DRM license includes rights of the devices and/or users, the rights determine aspects of the playback, copying, transfer, etc. of the content. The content source may set the usage rules and policies for licensing the content. When the user/device requests the DRM license from the DRM server, such as via a trusted software client, the rights particular to that user are utilized. The trusted client retrieves the content file and the content key, which it uses to then access the content.

As illustrated in FIG. 1b, when a second CPE (CPE 2) requests the same content (Content A), the content server provides content encrypted with a content key specific to the second device thereby creating a Content A-2 version of the requested content. Likewise, the DRM server will provide CPE 2 with DRM License 2 for accessing the protected content.

However, as previously noted, existing DRM technologies utilize device-specific encryption/decryption keys. Such DRM-based systems are accordingly incompatible with the previously referenced home networking models, as the transfer thereon would result in either (i) content that is not usable at the receiving device (due to failure to possess the appropriate license key or file), or (ii) simply a transfer of the content in an unprotected form.

Moreover, similar to CA technologies, the DRM approach described above has no authentication entity or "proxy" that can authenticate CPE or other connected devices in anticipation of providing download services, no video (media) provisioning system, and hence by nature is highly localized.

Various other technologies have demonstrated an ability to transfer content within a home network; however, such systems either do not use any DRM content protection, or utilize in-home DRM license generation for content protection. For example, the Motorola Televation™ device receives PowerKey signaling, and securely translates the rights and restrictions of that content from the PowerKey signaling to an Internet Protocol Rights Management-Home Network (IPRM-HN)/SecureMedia in-home DRM license. However, as discussed herein, in-home DRM license generation requires sharing sensitive information with the in-home device. Therefore, this mechanism dilutes the security of the DRM system, and may threaten the protection of the content.

Accordingly, improved apparatus and methods for distributing digital services to (and within) a user's premises are needed. Such improved apparatus and methods would ideally provide protection of content within the user's premises network, as well as outside of the premises network and across other networks.

In addition, the improved apparatus and methods would ideally enable content transfer within a given premises network in accordance with the rights established for the specific content, user, and/or rendering or storage device, without diluting or otherwise compromising the security of the transferred content.

SUMMARY

The foregoing needs are addressed herein by providing, inter alia, methods and apparatus for content transfer protection.

In a first aspect, a premises gateway apparatus configured to provide content to one or more client devices in communication therewith is disclosed. In one embodiment, said gateway apparatus includes: at least one first interface configured to permit communication between the gateway apparatus and a first network at least one second interface configured to communicate with said one or more client devices; a storage apparatus; and a digital processor configured to run at least one computer program thereon. In one variant, said computer program comprises a plurality of instructions which are configured to, when executed by said digital processor: request and receive said content and a content key from said first network via said first interface; receive a request from at least one of said one or more client devices for said content; decrypt said content via said content key; transcode said content from a first encoding format to a second encoding format, said second encoding format being compatible with capabilities of said at least one of said one or more client devices; re-encrypt said content via said content key; and provide said content to said at least one of said one or more client devices via said second interface.

In a second aspect, a method of providing content to one or more client devices is disclosed. In one embodiment, the one or more client devices are operative in a premises network sub-portion of a content delivery network, and said method includes: receiving said content at an intermediary entity of said premises network from a content server of said content delivery network, said content being encrypted according to a first access control standard; receiving a rights package from said content delivery network; receiving a request for said content from at least one of said one or more client devices in said premises network; and substantially in response to said request, said intermediary entity: decrypting said content via at least information received in said rights package; transcoding said content from a first encoding format to a second encoding format; re-encrypting said content according to a second access control standard; and providing said content to said at least one of said one or more client devices.

In a third aspect, a digital video recorder (DVR) apparatus configured to enable synchronization of content to one or more portable media devices (PMDs) is disclosed. In one embodiment, said DVR includes: at least one first interface configured to communicate with one or more entities of a content delivery network; a second interface configured to communicate with said one or more PMDs; a storage entity configured to store a plurality of encrypted content received from a content server of said content delivery network; and a processor configured to: run at least a digital rights management (DRM) client application thereon, said DRM client application configured to request and receive a DRM license from said content delivery network; and run at least one second computer application. In one variant, said computer program comprises a plurality of instructions which are configured to, when executed: receive a request for first content from said one or more PMD; identify said first content among said plurality of encrypted content stored at said storage entity; decrypt said first content via at least information contained in said DRM license; determine whether said identified first content comprises a format compatible with said one or more PMD; when it is determined that said format is not compatible, transcode said first content to a format compatible with said one or more PMD; re-encrypt said first content according to DRM standards; and provide said content to said one or more PMD.

In a fourth aspect, a method of synchronizing content from a first premises device to at least one portable device in communication therewith is disclosed. In one embodiment, said method includes: storing at least first content at a storage entity of said first in-home device, said at least first content being stored in a first encrypted format; requesting and storing a license via a client application running on said first premises device, said license received from a server in direct or indirect communication with said first premises device; receiving a request at said first premises device for said first content stored at said storage entity from said portable device; using at least information contained in said license to decrypt said first content from said first encrypted format and re-encrypt said first content to a second encrypted format; transcoding said first content from a first encoding format not compatible with said portable device to a second encoding format compatible with said portable device; and synchronizing said transcoded and re-encrypted first content to said portable device.

In a fifth aspect, a computer readable apparatus is disclosed. In one embodiment, the computer readable apparatus is configured to run at least one computer program thereon, the computer program comprising a plurality of instructions which are configured to, when executed, provide content to one or more client devices.

In a sixth aspect, a system is disclosed. In one embodiment, the system comprises a network for providing content to a gateway device, the gateway device configured to process the content and provide the same to one or more client devices in communication therewith.

In a seventh aspect, a client device is disclosed. In one embodiment, the client device is configured to receive content synchronized from a gateway apparatus.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 5b is a functional block diagram illustrating an exemplary embodiment of a digital video recorder (DVR) apparatus and of a portable media device (PMD) for the transfer of protected content according to the disclosure.

Figure 1A:
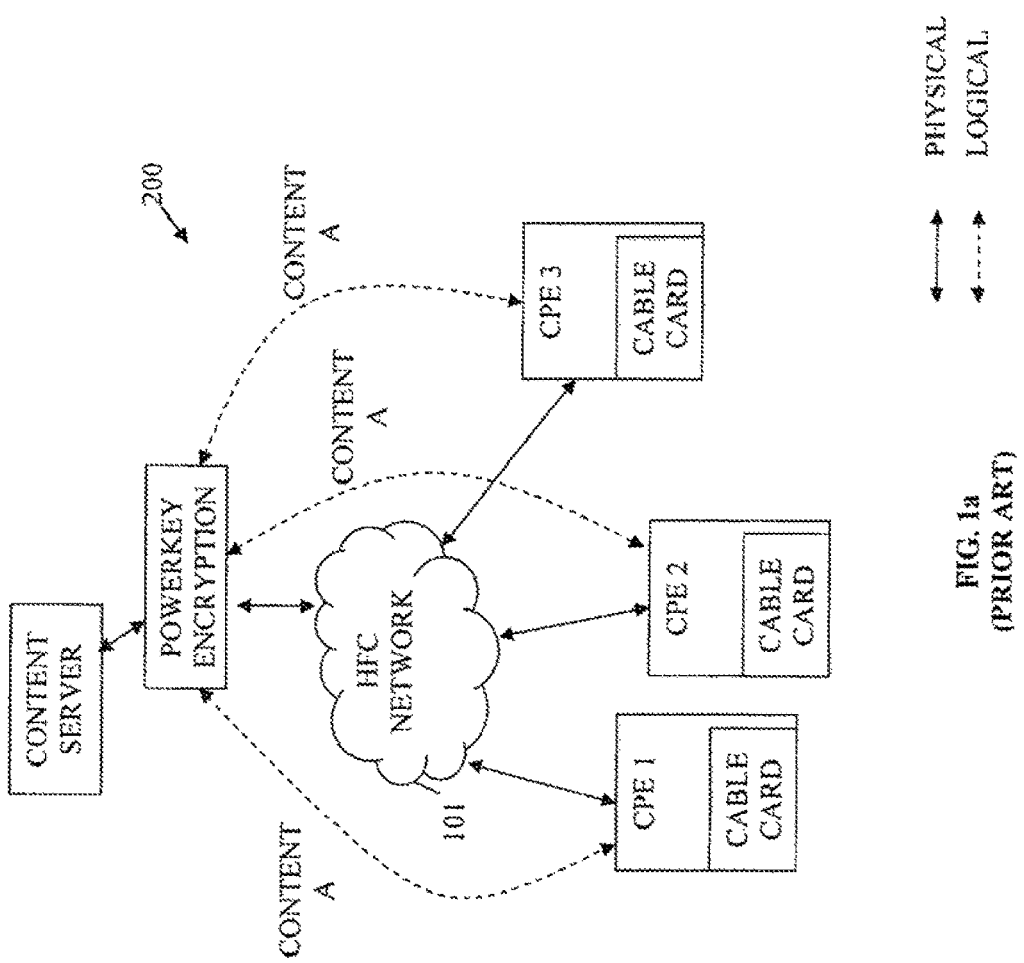
FIGS. 1a and 1b are a block diagrams illustrating typical prior art implementations of network architectures for providing protected content to a plurality of client devices in a network.
Figure 1B:
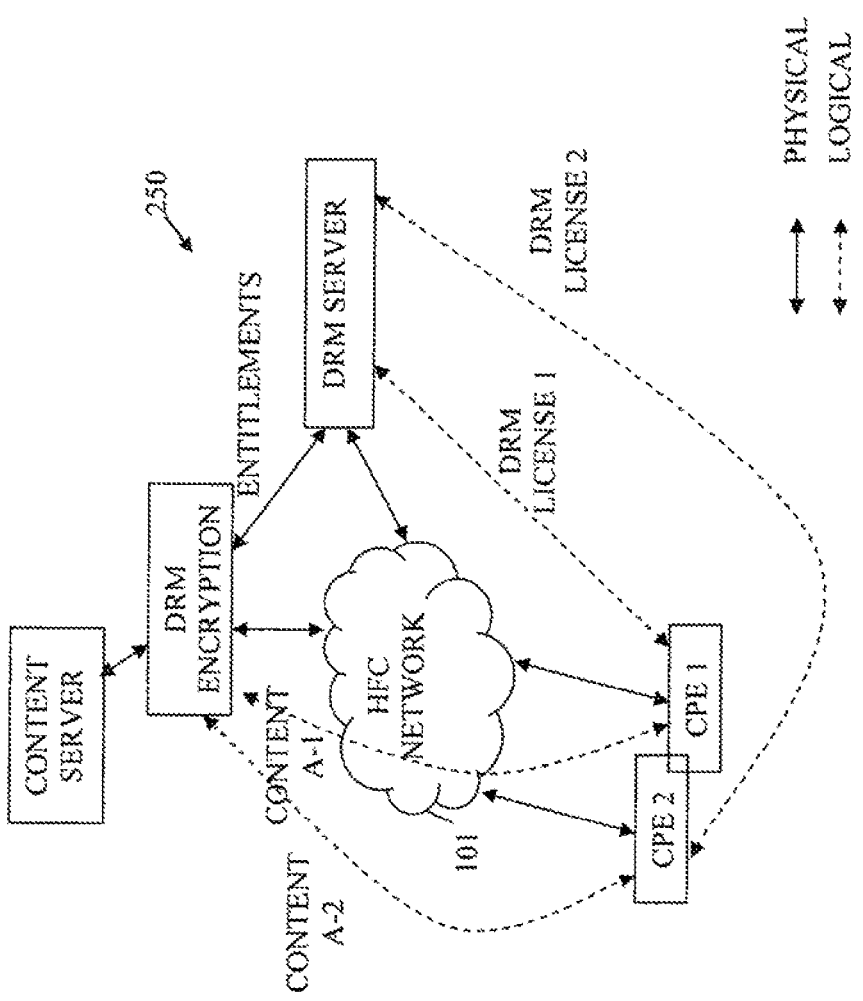

All Figures© Copyright 2012 Time Warner Cable, Inc. All rights reserved.

DETAILED DESCRIPTION

Reference is now made to the drawings, wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, DVRs, modems, personal computers (PCs), and minicomputers, whether desktop, laptop, or otherwise, and mobile devices such as handheld computers, PDAs, personal media devices (PMDs), tablets, and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Consumer Premises Equipment (CPE)" and "host device" refer without limitation to any type of electronic equipment located within a consumer's or user's premises and connected to a network. The term "host device" includes terminal devices that have access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term 'display" refers any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0.

As used herein, the term "gateway" includes, without limitation, devices configured to interface with a network, and pass signals to or exchange signals with, another device in communication therewith. Various exemplary gateways are described in, inter alia, co-owned U.S. patent application Ser. No. 11/818,236 filed on Jun. 13, 2007 entitled "PREMISES GATEWAY APPARATUS AND METHODS FOR USE IN A CONTENT-BASED NETWORK", now issued as U.S. Pat. No. 7,954,131, U.S. patent application Ser. No. 12/582,619 filed on Oct. 20, 2009 and entitled "GATEWAY APPARATUS AND METHODS FOR DIGITAL CONTENT DELIVERY IN A NETWORK", now issued as U.S. Pat. No. 9,027,062, and U.S. patent application Ser. No. 12/480,597 filed on Jun. 8, 2009 and entitled "MEDIA BRIDGE APPARATUS AND METHODS", now issued as U.S. Pat. No. 9,602,864 on Mar. 21, 2017, each of the foregoing being incorporated herein by reference in its entirety.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G LTE/LTE-A/TD-LTE, GSM, etc.) or IrDA families.

As used herein, the term "node" refers to any functional entity associated with a network, such as for example an OLT or ONU, whether physically discrete or distributed across multiple locations.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer system or network.

As used herein, the terms "service", "content", and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers without limitation to either a group of service users (e.g., subscribers), or the resources shared by them in the form of, for example, entire cable RF signal, only the RF channels used to receive the service or otherwise treated as a single logical unit by the network for resource assignment.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11 a/b/g/n/s/v or 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

In one salient aspect, the present disclosure provides methods and apparatus for transferring protected content. In one embodiment, the content is delivered via a managed content distribution network (such as a cable or satellite or HFCu network having an MSO), wherein the MSO manages the rights and restrictions of the content outside of a premises, and in a data center or headend, by providing requested content to a gateway device within the premises.

The content is, in the exemplary embodiment, provided in a first encryption format and encoded using a first codec, both of which are compatible with the gateway device. In order to provide for a transfer of the content within and outside of the premises network, the gateway is configured to transcrypt the content into an encryption format, and transcode using a codec, that are each compatible with a device which requests the content therefrom. In one implementation, the content is received at the gateway as MPEG-2 content encrypted using Powerkey conditional access (CA) technology. The gateway uses its associated CableCard to decrypt the content, and a transcoder entity to transcode the content to e.g., MPEG-4 (or other appropriate format). The content is then re-encrypted to DRM using a content key obtained from a DRM server and a transcrypter of the gateway. This approach advantageously preserves content rights and asserts restrictions on use or distribution of content, via the user's premises gateway.

The exemplary gateway apparatus then transmits the content to a requesting client device (e.g., CPE), the CPE must use the same content key to decrypt the content as was used by the gateway when the content was transcrypted. Therefore, the gateway and devices in communication with the gateway (and which would presumably request content therefrom) are established to use the same DRM client.

In another embodiment, content is transferred from a DVR to other portable devices in communication therewith. to the DVR receives content in a first format and encryption scheme, and transcodes and/or transcrypts the content to a format and scheme with which requesting devices are compatible. In one exemplary implementation, the requirement for transcryption is removed by using the same DRM algorithm to protect content on both the DVR and the requesting devices. In one variant, the DVR and the requesting devices each use the same DRM client to request a DRM license from a DRM server.

Using the same algorithm for both client applications advantageously enables the MSO to control and change usage rights and restrictions at any time up through content playback, and regardless of any transfer of the content between devices (i.e., between the gateway and/or DVR and the requesting devices in communication therewith).

Detailed Description of Exemplary Embodiments

Exemplary embodiments of the apparatus and methods for transferring protected content of the present disclosure are now described in detail. While these exemplary embodiments are described in the context of a hybrid fiber coax (HFC) cable architecture having a multiple systems operator (MSO), digital networking capability, and plurality of client devices/CPE, the general principles and advantages of the disclosure may be extended to other types of networks and architectures, whether broadband, narrowband, wired or wireless, content or data, or otherwise. Hence, the following description is merely exemplary in nature. For example, the disclosure may be practiced over a fiber-to-the-home (FTTH) or fiber-to-the-curb (FTTC) system, hybrid fiber-copper (HFCu) network, or over satellite or millimeter wave-based networks having two-way capabilities similar to today's digital cable HFC networks.

It will also be appreciated that while described generally in the context of a network providing service to a customer or consumer (i.e., residential) end user domain, the present disclosure may be readily adapted to other types of environments including, e.g., commercial/enterprise, and government/military applications. Myriad other applications are possible.

Bearer Network Architecture

Figure 2:
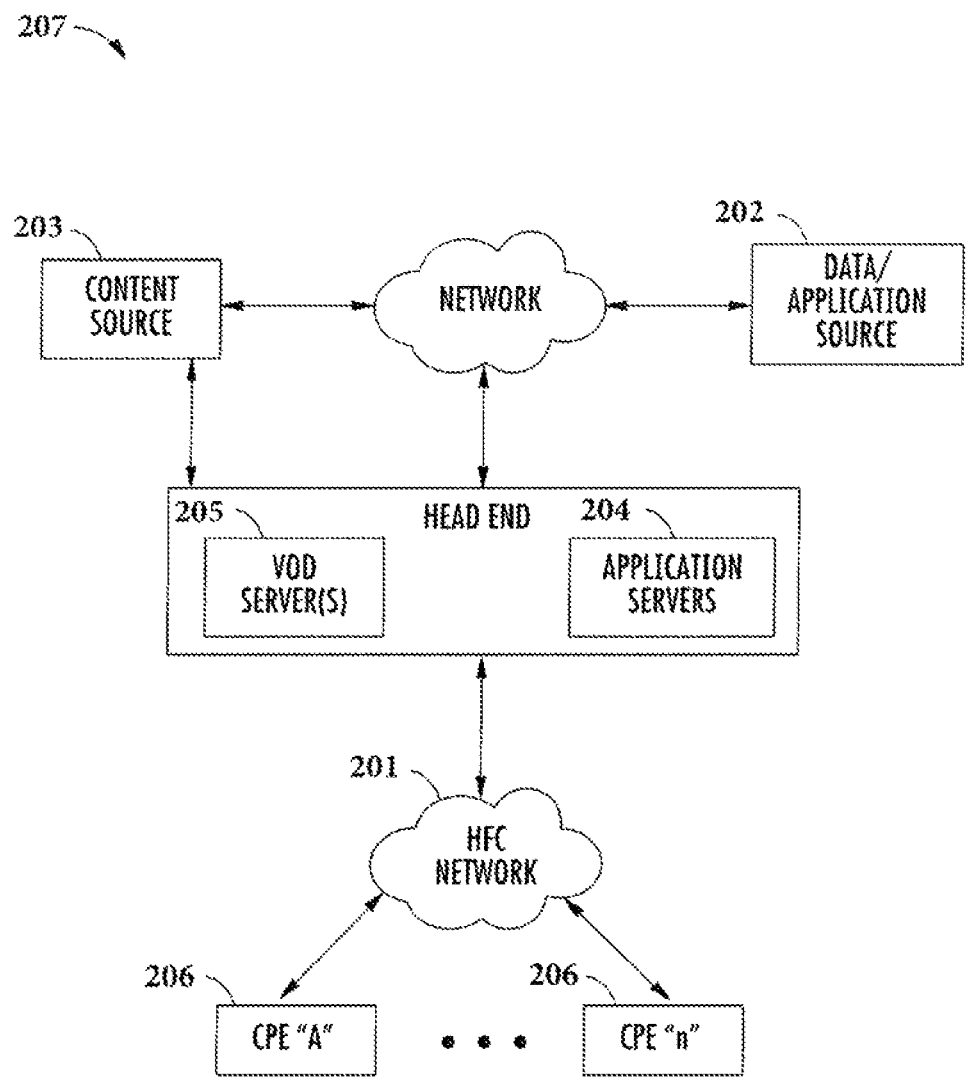
FIG. 2 is a functional block diagram illustrating an exemplary HFC cable network configuration useful with the present disclosure.

FIG. 2 illustrates a typical content distribution network configuration with which the apparatus and methods of the present disclosure may be used. The various components of the network 207 include (i) one or more data and application origination points 202; (ii) one or more content sources 203, (iii) one or more application distribution servers 204; (iv) one or more VOD servers 205, and (v) consumer premises equipment (CPE) 206. The distribution server(s) 204, VOD servers 205 and CPE(s) 206 are connected via a bearer (e.g., HFC) network 201. A simple architecture comprising one of each of the aforementioned components 202, 204, 205, 206 is shown in FIG. 2 for simplicity, although it will be recognized that comparable architectures with multiple origination points, distribution servers, VOD servers, and/or CPE devices (as well as different network topologies) may be utilized consistent with the disclosure. For example, the headend architecture of FIG. 2a (described in greater detail below) may be used.

The data/application origination point 202 comprises any medium that allows data and/or applications (such as a VOD-based application, gaming application, or "Watch TV" application) to be transferred to a distribution server 204. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 204 comprises a computer system where such applications can enter the network system. Distribution servers are well known in the networking arts, and accordingly not described further herein.

The VOD server 205 comprises a computer system where on-demand content can be received from one or more of the aforementioned data sources 202 and enter the network system. These servers may generate the content locally, or alternatively act as a gateway or intermediary from a distant source.

The CPE 206 includes any equipment in the "customers' premises" (or other locations, whether local or remote to the servers 204, 205) that can be accessed by a distribution server 204 or VOD server 205.

Figure 2A:
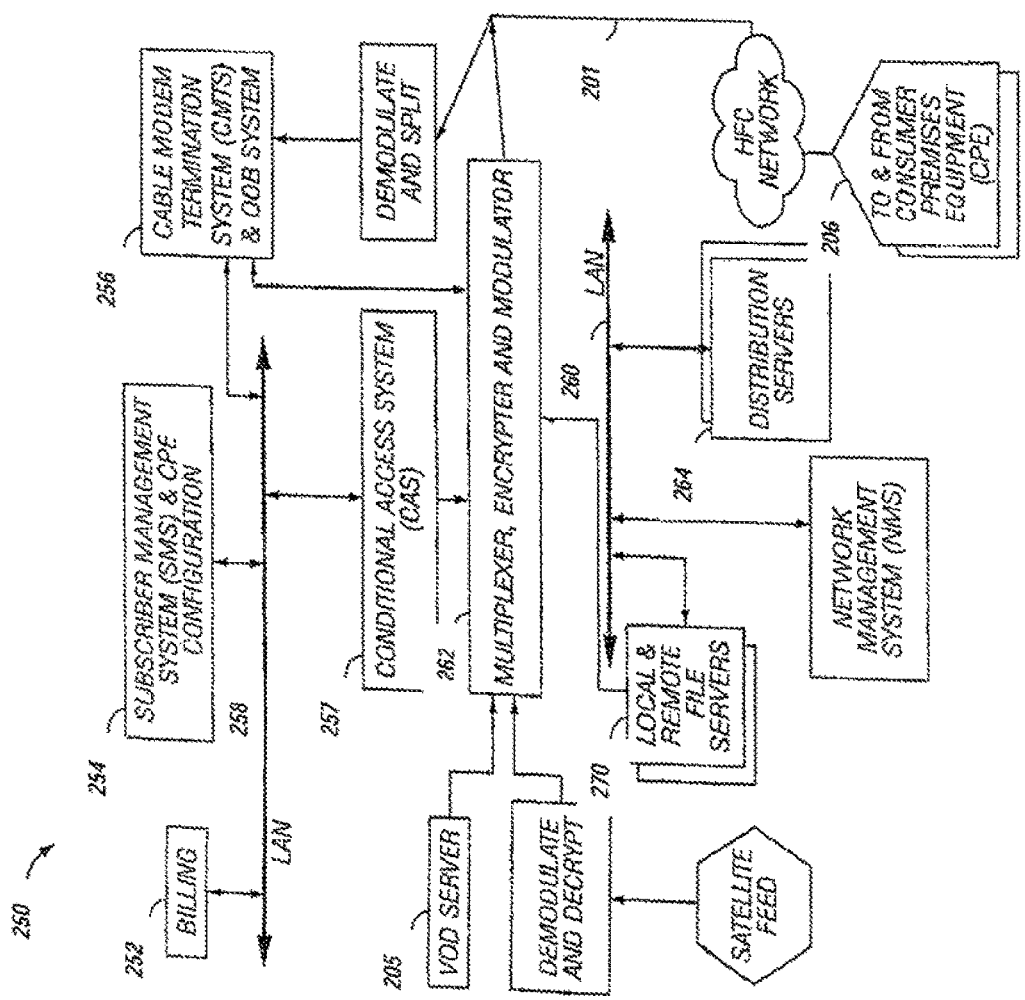
FIG. 2a is a functional block diagram illustrating one exemplary HFC cable network headend configuration useful with the present disclosure.

Referring now to FIG. 2a, one exemplary embodiment of headend architecture useful with the present disclosure is described. As shown in FIG. 2a, the headend architecture 250 comprises typical headend components and services including billing module 252, subscriber management system (SMS) and CPE configuration management module 254, cable-modem termination system (CMTS) and OOB system 256, as well as LAN(s) 258, 260 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 2a is high-level, conceptual architecture and that each MSO may have multiple headends deployed using custom architectures.

The architecture 250 of FIG. 2a further includes a multiplexer/encrypter/modulator (MEM) 262 coupled to the HFC network 201 adapted to "condition" content for transmission over the network. The distribution servers 264 are coupled to the LAN 260, which provides access to the MEM 262 and network 201 via one or more file servers 270. The VOD servers 205 are coupled to the LAN 260 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 250 to the CPE 206 ("downstream") are multiplexed together in the headend and sent to neighborhood hubs (FIG. 2*b*) via a variety of interposed network components.

Content (e.g., audio, video, data, applications, etc.) is provided in each downstream (in-band) channel associated with the relevant service group. To communicate with the headend or intermediary node (e.g., hub server), the CPE 206 may use the out-of-band (OOB) or DOCSIS channels and associated protocols. The OCAP 1.0, 2.0, 3.0 (and subsequent) specification provides for exemplary networking protocols both downstream and upstream, although the disclosure is in no way limited to these approaches.

Figure 2B:
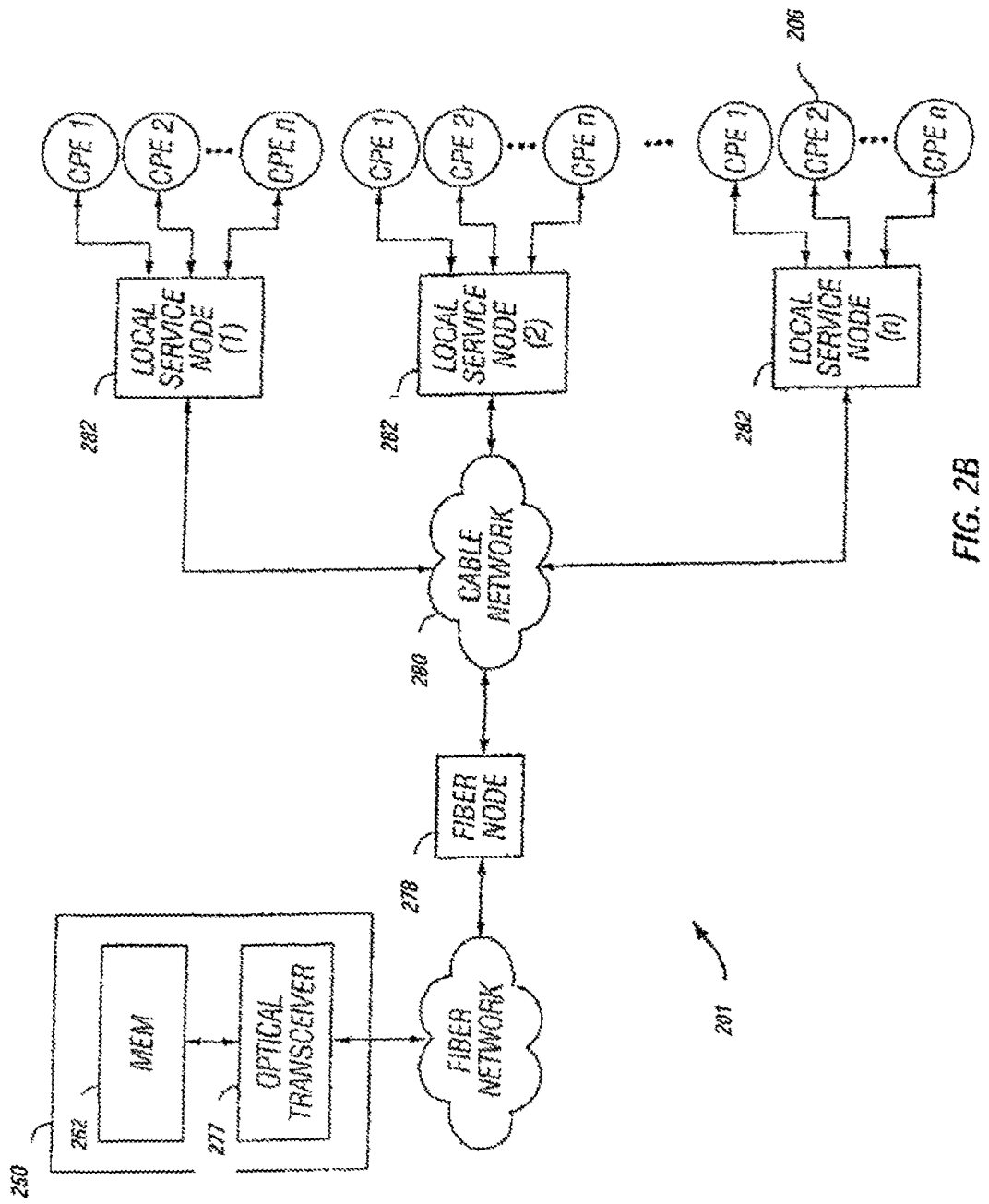
FIG. 2b is a functional block diagram illustrating one exemplary local service node configuration useful with the present disclosure.

As shown in FIG. 2*b*, the network 201 of FIGS. 2 and 2*a* comprises a fiber/coax arrangement wherein the output of the MEM 262 of FIG. 2*a* is transferred to the optical domain (such as via an optical transceiver 277 at the headend or further downstream). The optical domain signals are then distributed to a fiber node 278, which further distributes the signals over a distribution network 280 to a plurality of local servicing nodes 282. This provides an effective 1:N expansion of the network at the local service end.

"Switched" Networks

Figure 2C:
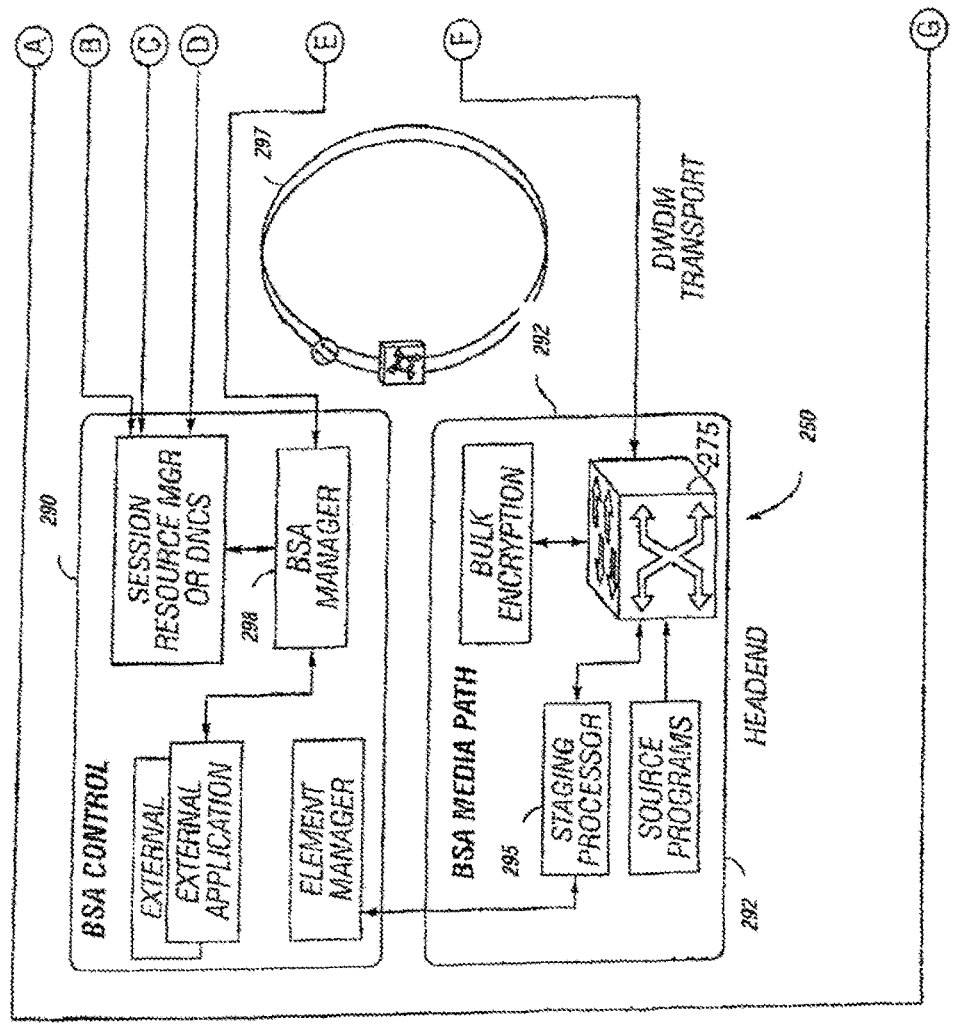
FIG. 2c is a functional block diagram illustrating one exemplary broadcast switched architecture (BSA) network useful with the present disclosure.
Figure 2C:
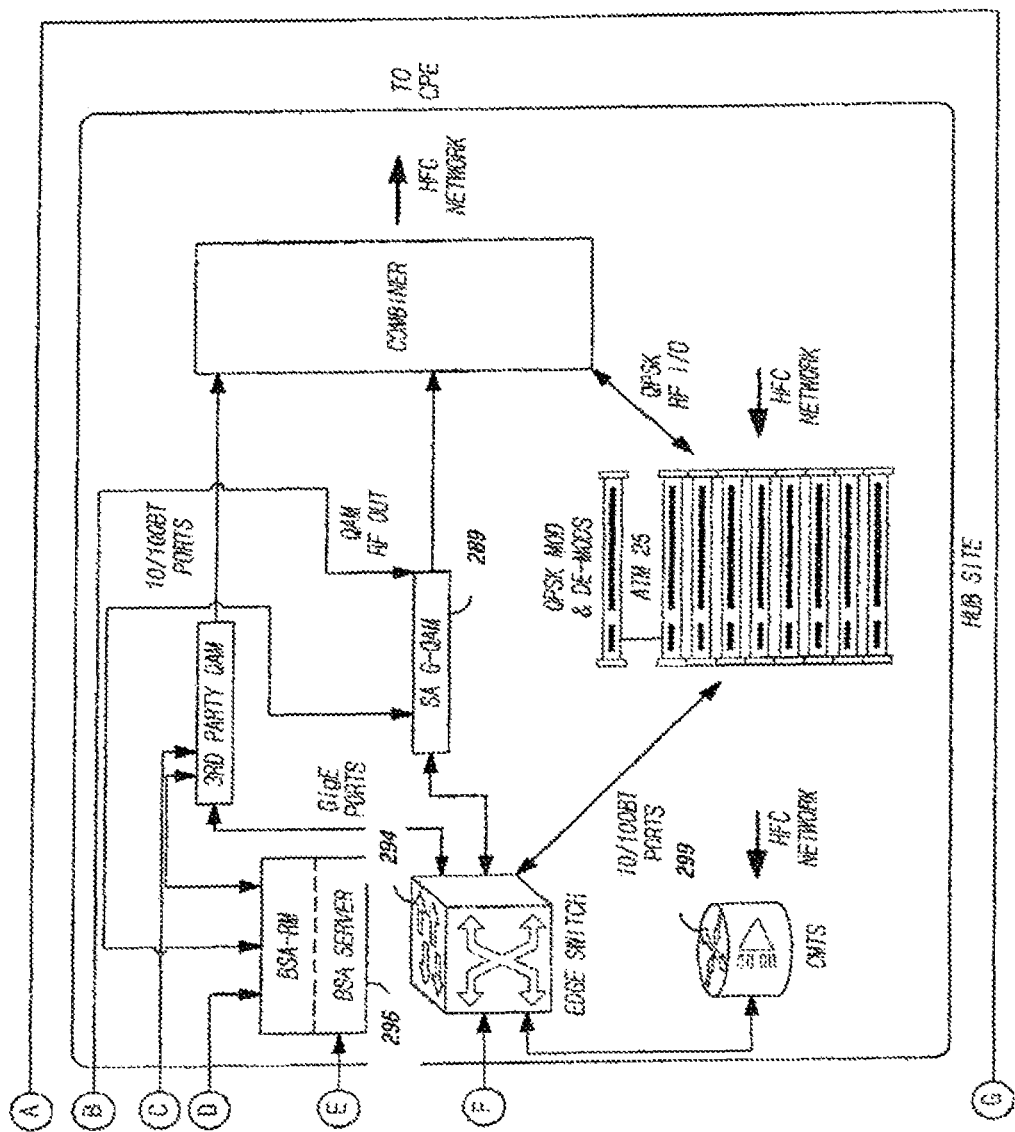

FIG. 2*c* illustrates an exemplary "switched" network architecture also useful with the present disclosure. Switching architectures allow improved efficiency of bandwidth use for ordinary digital broadcast programs. Ideally, the subscriber will be unaware of any difference between programs delivered using a switched network and ordinary streaming broadcast delivery.

FIG. 2*c* shows the implementation details of one exemplary embodiment of this broadcast switched network architecture. Specifically, the headend 250 contains switched broadcast control and media path functions 290, 292; these element cooperating to control and feed, respectively, downstream or edge switching devices 294 at the hub site which are used to selectively switch broadcast streams to various service groups. A BSA server 296 is also typically disposed at the hub site, and implements functions related to switching and bandwidth conservation (in conjunction with a management entity 298 disposed at the headend). An optical transport ring 297 is utilized to distribute the dense wave-division multiplexed (DWDM) optical signals to each hub in an efficient fashion.

Co-owned U.S. Patent Application Publication No. 2003/0056217 filed Sep. 20, 2001 and entitled "TECHNIQUE FOR EFFECTIVELY PROVIDING PROGRAM MATERIAL IN A CABLE TELEVISION SYSTEM", which is now issued as U.S. Pat. No. 8,713,623, incorporated herein by reference in its entirety, describes one exemplary broadcast switched digital architecture useful with the present disclosure, although it will be recognized by those of ordinary skill that other approaches and architectures may be substituted.

In addition to "broadcast" content (e.g., video programming), the systems of FIGS. 2*a*-2*c* can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable or other modem.

Referring again to FIG. 2*c*, the IP packets associated with Internet services are received by edge switch 294, and forwarded to the cable modem termination system (CMTS) 299. The CMTS examines the packets, and forwards packets intended for the local network to the edge switch 294. Other packets are discarded or routed to another component. The edge switch 294 forwards the packets receive from the CMTS 299 to the QAM modulator 289, which transmits the packets on one or more physical (QAM-modulated RF) channels to the CPEs (or CD). The IP packets are typically transmitted on RF channels that are different than the RF channels used for the broadcast video and audio programming, although this is not a requirement. The CPE 206 are each configured to monitor the particular assigned RF channel (such as via a port or socket ID/address, or other such mechanism) for IP packets intended for the subscriber premises/address that they serve.

Packet-Optimized Architectures

Figure 2D:
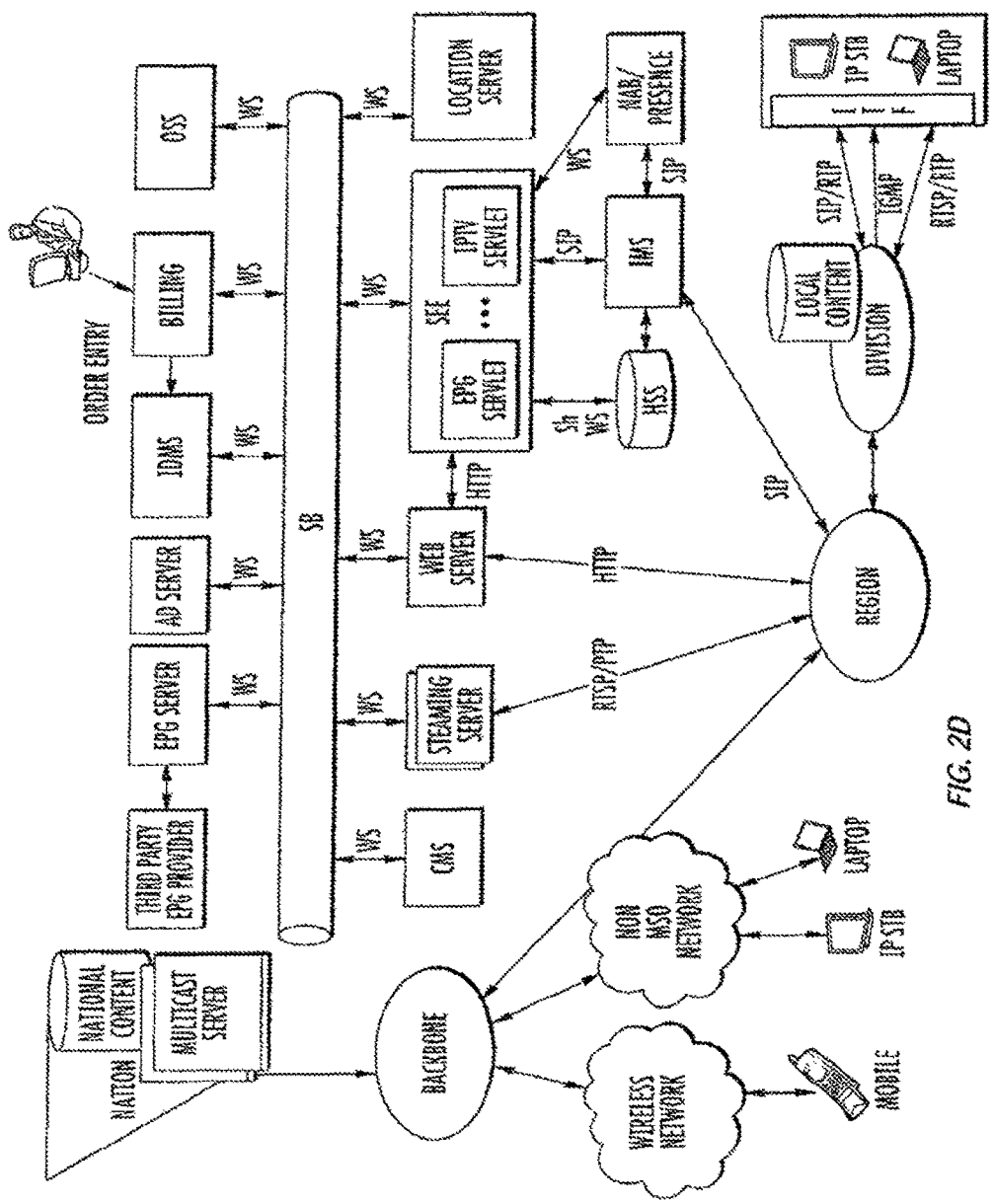
FIG. 2d is a functional block diagram illustrating one exemplary packetized content delivery network architecture useful with the present disclosure.

While the foregoing network architectures described herein can (and in fact do) carry packetized content (e.g., IP over MPEG for high-speed data or Internet TV, MPEG-2 packet content over QAM for MPTS, etc.), they are often not optimized for such delivery. Hence, in accordance with another embodiment of the present disclosure, a "packet optimized" delivery network is used for carriage of the packet content (e.g., IPTV content) when the request issues from an MSO network (see discussion of FIG. 2*a* below). FIG. 2*d* illustrates one exemplary implementation of such a network, in the context of an IMS (IP Multimedia Subsystem) network with common control plane and service delivery platform (SDP), as described in co-pending U.S. Patent Application Publication No. 2011/0103374 filed on Apr. 21, 2010 and entitled "METHODS AND APPARATUS FOR PACKETIZED CONTENT DELIVERY OVER A CONTENT DELIVERY NETWORK", incorporated herein by reference in its entirety. Such a network provides significant enhancements in terms of common control of different services, implementation and management of content delivery sessions according to unicast or multicast models, quality-of-service (QoS) for IP-packetized content streams, etc.; however, it is appreciated that the various features of the present disclosure are in no way limited to any of the foregoing architectures.

Protected Content Transfer Network Architectures

The following figures illustrate exemplary architectures, methods, and apparatus for providing improved systems for the transfer of content to and within a premises network. It is appreciated that although illustrated and discussed with respect to an HFC network, and Powerkey or DRM encryption, the present disclosure may be applied across any number of networks (including e.g., satellite, Internet, cellular, etc.) and encryption or content protection schemes (such as other CA, TD, and/or DRM configurations).

Figure 3A:
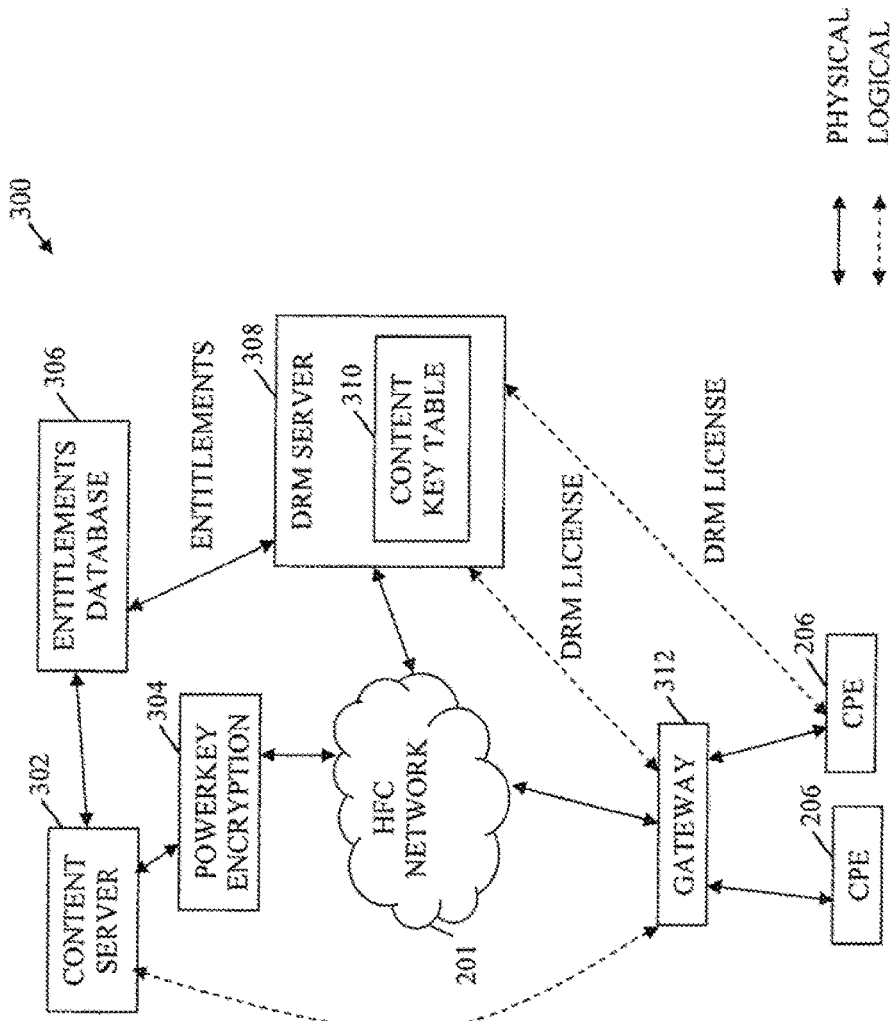
FIGS. 3a and 3b are block diagrams illustrating exemplary embodiments of network architecture s for transferring protected content according to the present disclosure.

Referring now to FIG. 3a, an exemplary inventive network 300 configuration according to the present disclosure is illustrated. As shown, the limitations of the prior art configurations are overcome in that, inter alia, content is provided from a content server 302 to a home gateway device 312, which in turn is configured to transmit content to various client devices 206 in communication therewith. Although illustrated with respect to an HFC content delivery network such as the network 201 of FIG. 2 herein, it is appreciated that the content server 302 may communicate to the client devices 206 via any other type of content delivery network, such as e.g., an internetwork, a satellite network, HFCu network, etc.

Consistent with prior art methods for delivering protected content to a first device (see e.g., FIG. 1a above), the content is provided from the content server 302 to the gateway 312 via the interposed delivery network. In one embodiment, the content is transmitted as MPEG-2 content using PowerKey conditional access technology (applied at a PowerKey encryption entity 304). However, in the illustrated inventive system, the gateway 312 is configured to process the received content, and transmit the content to the various CPE 206 in communication therewith. The gateway 312 cannot transmit PowerKey content to CPE 206 which do not have CableCards. Thus, in order to preserve rights and assert restrictions for the content, the gateway 312 processes the content by translating it from PowerKey MPEG-2 content to DRM MPEG-4 content. In other words, in the exemplary implementation, DRM is applied at same time as the content is processed from MPEG-2 to MPEG-4 by the gateway 312. It is appreciated, however, that in the instance that the receiving device utilizes MPEG-2 (or can utilize multiple formats including MPEG-2), the translation step may be omitted.

As noted above, in certain instances it may be necessary to transcode content from, for example, MPEG-2 to MPEG-4. This is accomplished via one or more prior art methods which decode the MPEG-2 content, then subsequently re-encode the content as MPEG-4.

The application of DRM involves having many proprietary DRM "secrets"; in this case, they would need to be known by the gateway 312 performing the content translation. In other words, in order to generate a DRM license, the gateway 312 would require all the secrets that are built into a DRM license server. However, because the gateway 312 is located in the user's premises, this would in essence mean that every premises that has the translation device (i.e., gateway 312) must also contain the proprietary DRM secrets. Such a configuration would, inter alia, significantly dilute the security of the DRM system. It is noted that the rights and restrictions are known at the time the content is generated (i.e., at the content server 302), and can be captured in both PowerKey and DRM license prior to content translation. Hence, the present embodiment of the inventive architecture utilizes a DRM license generated elsewhere (e.g., at a network-based DRM server 308). This approach enables the DRM secrets to remain in a physically safe environment (i.e., the network headend and/or secure DRM server), and out of the user's premises. This also enables the translation device (i.e., gateway 312) to implement a common DRM client to retrieve the key, which it then uses to encrypt the content. Since DRM technologies utilize the same content key for encryption and decryption, the gateway 312 requests the DRM license from the DRM server 308 using the same DRM client as will be later used by the CPE 206 when requesting content (see discussion below), and uses the key contained therein to re-encrypt the content (from PowerKey to DRM).

In order to enable the foregoing functionality, the DRM server 308 of the illustrated embodiment keeps a table of available content (and a content key which corresponds to each); i.e., the content key table 310. When the gateway 312 requests the DRM license (in order to re-encrypt the content), the DRM server 310 consults an entitlements database 306 to determine whether the gateway 312 is associated to an authenticated user, and/or whether the device or user is authorized to obtain access to the content. In addition, the rights and restrictions of the user and/or device are also determined in this embodiment via cooperation of the entitlements database 306, the DRM server 310 and other entities of the headend network (such as those associated with billing, account management, etc.; not shown). These are utilized by the DRM server 310 when developing the DRM license. The rights and restrictions may include without limitation: (i) HDMI only, (ii) copy never, (iii) copy once, (iv) copy unlimited, (iv) number of simultaneous devices allowed, (vi) duration of use/rental, and (viii) ability to view off-line. As noted above, the gateway 312 of the illustrated embodiment utilizes the key contained within the DRM license to re-encrypt content received from the content server 302 from the exemplary PowerKey format to a DRM format. Similarly, when the user device 206 begins to play the content (which was transferred to it from the gateway 312), the device 206 discovers that the content is encrypted, and requests the DRM licenses (containing the content key) for that content directly from the DRM server 310. Based on one or more business policies set by the network operator, the DRM server 310 grants or denies the request for the content key to that user and/or device 206, based on entitlement information obtained from the entitlements database 306. An exemplary entitlements architecture and method useful with the present disclosure is set forth in co-owned U.S. patent application Ser. No. 12/536,724 filed on Aug. 6, 2009 and entitled "SYSTEM AND METHOD FOR MANAGING ENTITLEMENTS TO DATA OVER A NETWORK", now issued as U.S. Pat. No. 8,341,242, which is incorporated herein by reference in its entirety. Assuming the user and/or device 206 is entitled, the DRM server 310 packages the content key along with the rights and restrictions in a DRM license, which is also encrypted in a way that only the requesting user device 206 can access the contents of the DRM license.

In one embodiment, this is accomplished via utilization of public/private key pair encryption schemes. It is appreciated however, that a DRM vendor may use proprietary mechanisms for ensuring that only trusted DRM clients can access the contents of only the DRM license to which that DRM client is entitled.

In one exemplary embodiment, the gateway 312 is configured to run a DRM client thereon, which is configured to request the DRM licenses from the DRM server 310 as if the gateway was the consuming device. Additionally, the gateway is further configured to run at least one computer program for decrypting the content, and re-encrypting the content using the content key from the DRM license.

With respect to content stored on a DVR, current systems use proprietary encryption algorithms at the DVR to protect content on the hard drive. Under these systems, the content must be transcrypted in order to enable DRM applications (such as e.g., the commercially available Allway® Sync n' Go DRM application, and/or the AnyPlay™ application utilized by Comcast®, etc.) at the portable media devices (PMD).

Figure 3B:
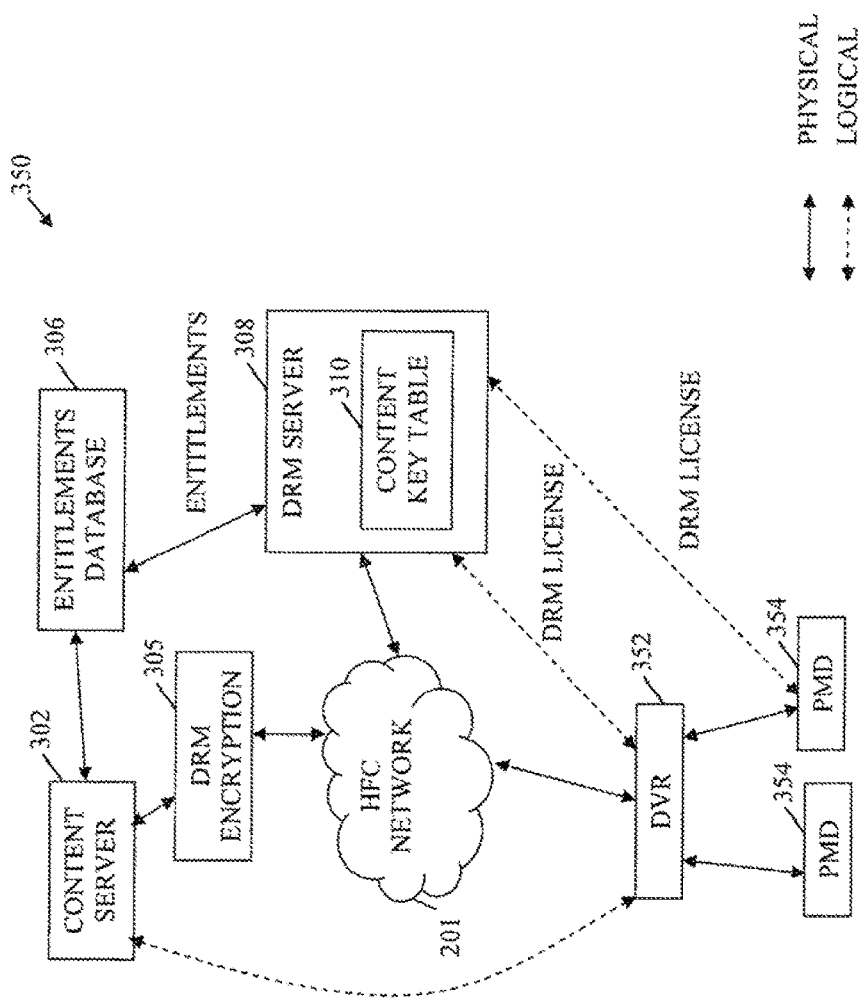

Referring now to FIG. 3b, an exemplary embodiment of a network architecture 350 for enabling protected transfer of content from an in-premises DVR 352 is disclosed. In the illustrated embodiment, the requirement for transcryption is removed by using the same DRM algorithm to protect content on the DVR 352 and the portable device 354. Using the same algorithm for both applications enables the MSO to control and change usage rights and restrictions at any time up through content playback, and irrespective of any transfer of the content between devices.

In the illustrated embodiment, content is delivered from a content server 302 to a network DRM encryption entity 305 for encryption, then provided to a DVR 352 via a network (e.g., the MSO's distribution network 201) for recording. At the time of recording, the DVR 352 receives, either through a request to the DRM server 308, targeted unicast, or broadcast, a DRM license for the storage of the content. The DVR 352 uses the same DRM client as is used by the requesting devices (e.g., PMD 354) to request and process the DRM license. In one embodiment, the DRM license only includes rights for storage and playback on the DVR 352; alternatively additional rights may be conveyed in the DVR 352 DRM license as well (such as copy once, copy never, etc.). In the instance where the DVR 352 must re-encrypt the content (as discussed below) because it has utilized the same DRM client as the requesting PMD 354, the content key derived therefrom may be used for encryption.

As illustrated and in a manner similar to that discussed above with respect to FIG. 3a, the DRM server 308 consults a content key table 310 or other data structure to determine an appropriate key for delivery to the requesting devices (DVR 352 and PMD 354). In addition, the DRM server 308 is also configured to communicate with an entitlements database 306 (or use a comparable mechanism) to determine the rights of the devices and/or users to the requested content. These rights are included in the illustrated embodiment during generation of the DRM license at the DRM server 308.

In the embodiment of FIG. 3b, when a downstream client device 354 requests a DVR asset DEFINE ASSET, the DVR 352 downloads the protected asset to the client 354; if the content is in an appropriate format for the requesting client 354. If the content is not in an appropriate format for the requesting device 354, the DVR 352 uses its CA or DRM license to decrypt, transcode, then re-encrypt the DVR asset for the requesting downstream client device 354. If the content is in the appropriate format, the content is merely transmitted to the requesting device without processing. At the time of download or playback, the downstream device 354 requests its own DRM license for accessing the content from the DRM server 308, and not from the DVR 352. In one embodiment, the rights included in the DRM license include rights for off-line playback.

According to the embodiment of FIG. 3b, the DVR 352 implements the DRM algorithm to replace any proprietary encryption mechanism used in prior art DVR systems. In addition, the DVR 352 implements the DRM client to retrieve and process the DRM license in order to obtain the content key used for decryption and encryption of the content on the hard drive using the DRM algorithm (for subsequent transmission to client (e.g., PMD) 354 in communication therewith).

Exemplary methods to enable the foregoing functionalities will now be discussed in greater detail.

Methods

Figure 4A:
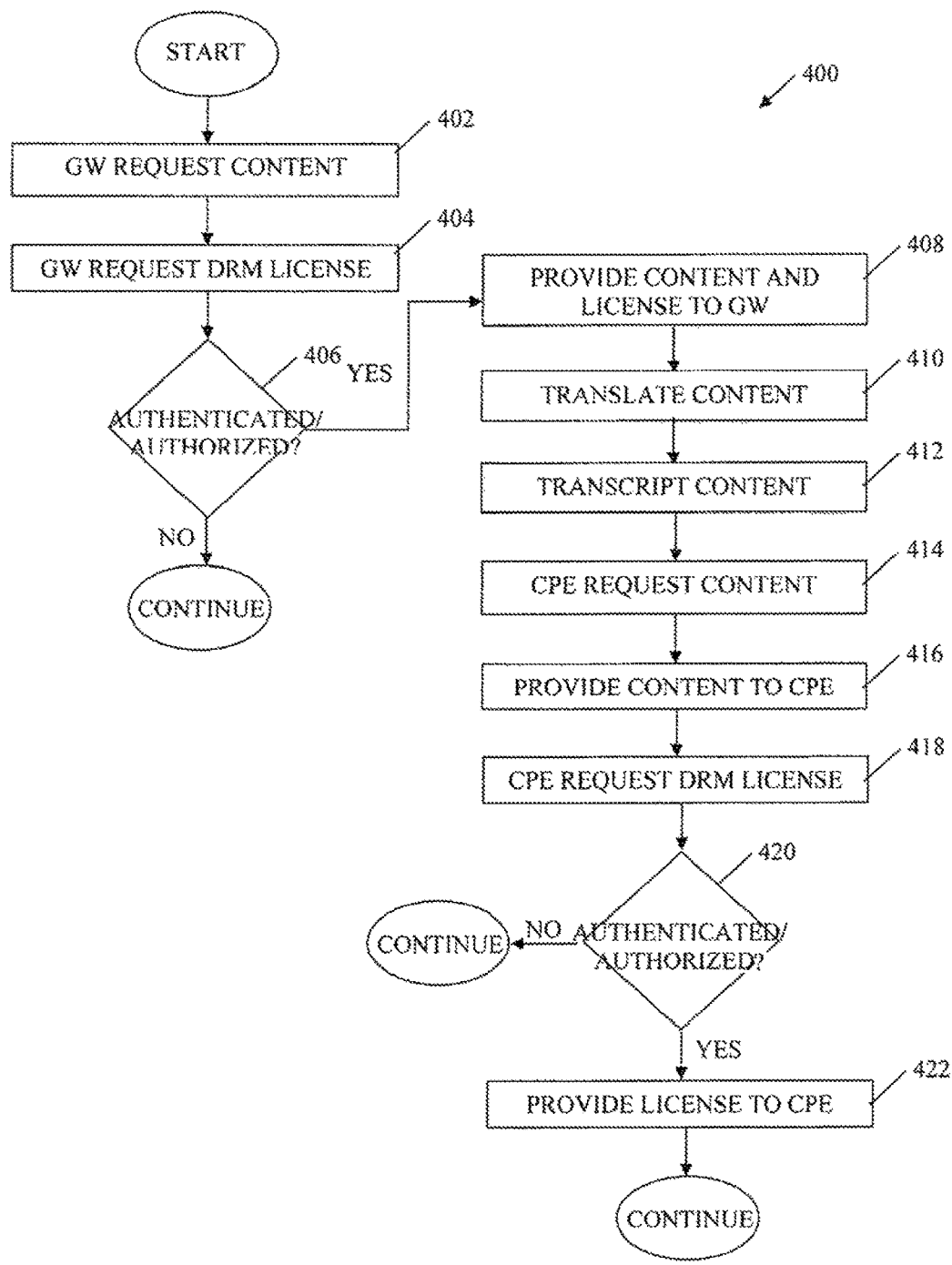
FIGS. 4a and 4b are logical flow diagrams illustrating exemplary embodiments of methods for transferring protected content according to the present disclosure.

Referring now to FIG. 4a, one embodiment of a method 400 for transferring protected content in a premises network, such as that discussed above with respect to FIG. 3a, is illustrated. As shown, per step 402, the premises translation device (i.e., gateway 312) requests content from the network as if it were an end user (e.g., content rendering) device.

In order for the gateway 312 to encrypt the content (see discussion provided below), it must have the correct content key for that content element. Note that the content key is in the present embodiment symmetrical in nature, so the same content key is used to encrypt and decrypt. Thus, at step 404, the gateway 312 requests the DRM license from the DRM server 308. As noted above, the gateway 312 does not generate the content key and/or DRM license itself.

Per step 406, the DRM server 308, entitlements database 306, and content server 302 cooperate to determine whether the gateway 312 (and/or a subscriber associated thereto) is authorized and/or authenticated to receive the requested content. The use, reproduction, transfer, and/or other rights of the subscriber or device with respect to the content may also determined. Once the authentication/authorization (and rights as applicable) is determined, the requested content is provided to the gateway 312 from the content server 302 via the encryption entity 304 (step 408), such as in PowerKey format, and the DRM server 308 generates a DRM license for delivery to the gateway 312 as well (step 408). This may be accomplished via e.g., utilization of a content key table 310 or other data structure at the server 308, or a remote entity in communication therewith.

It is further noted that the foregoing authentication/authorization may be determined e.g., based on a subscriber ID or MAC address of a requesting device. This information may also constitute for instance a one-way cryptographic "hash" that anonymously yet uniquely identifies the ID or MAC address without divulging the identity of the user; see e.g., co-owned U.S. patent application Ser. No. 11/186,452 filed on Jul. 20, 2005 and entitled "METHOD AND APPARATUS FOR BOUNDARY-BASED NETWORK OPERATION", incorporated herein by reference in its entirety, for one exemplary hashing approach useful with the present disclosure. Alternatively, a user may be required to "log-in" to the system in order to have content provided thereto. A log-in requirement is especially useful in Internet or other non-managed content delivery systems to ensure delivery to authorized users.

The gateway 312 in the illustrated exemplary HFC context tunes to the appropriate QAM for receiving the requested content, and begins decoding it. Next, at step 410, the gateway 312 transcodes the content. In one embodiment, content is received as PowerKey encrypted and MPEG-2 encoded content and, while translating the MPEG-2 content into MPEG-4 for subsequent requesting devices (e.g., CPE 206), the gateway 312 also transcrypts the content from PowerKey to the applicable DRM format (step 412).

Rather than the gateway 312 using the content key from the previously obtained DRM license for decryption and play-back (as is the normal function of the content key at a premises device), the gateway 312 uses the content key for translation or encryption. The gateway 312 encrypts the piece of content using well-known DRM encryption algorithms, then makes it available to the requesting device in the same way a network content server would. Hence, in one respect, the gateway can be thought of as a "local DRM-based content server" for any other premises devices.

As noted above, because the gateway 312 uses the same DRM client as the requesting device 206 to request the DRM license from the DRM server 308, the content key used in translation (i.e., by the gateway 312 to encrypt the content) is the same content key is provided to the client device 206 for decryption (see discussion below). This advantageously allows the gateway to provide a transparency or pass-through functionality with respect to the DRM license/rights.

At step 414, a request for content is received from the CPE 206 at the gateway device 312 and the content is provided thereto at step 416. When the requesting device 206 begins to play the content, it discovers that the content is encrypted, and therefore requests a DRM license for that content directly from the DRM server 308, and not from the gateway 312 (step 418). This allows the requesting device to implement a single DRM client and video pipeline that operate the same way whether the content is obtained through the gateway 312 (translation) or directly from the network 201.

At step 420, the DRM server 308 determines whether the requesting client 206 is authorized/authenticated to receive access to the content (and the rights associated therewith). As discussed above, this may be accomplished via a content key table 310 at the server 308 and communication of the server 308 to various network entities (including e.g., an entitlements database 306, billing entity, account management entity, etc.). When it is determined that the device 206 is authorized to receive access to the content, an appropriate DRM license is provided thereto (step 422) and the CPE 106 may begin decryption and playback according to the rights transmitted in the DRM license.

Figure 4B:
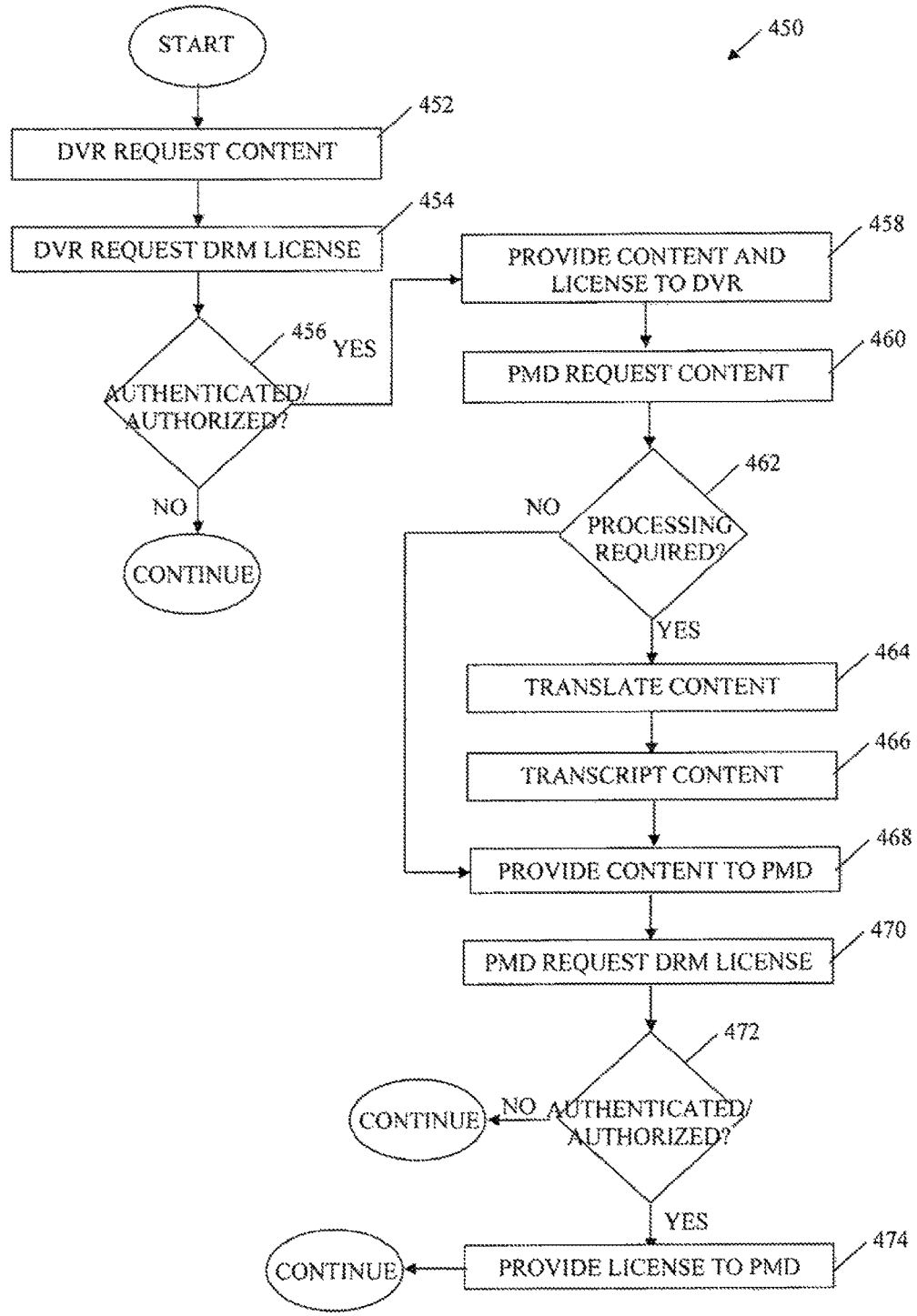

Another embodiment of a method 450 for the transmission of protected content within a premises network, such as that discussed above with respect to FIG. 3b, is illustrated at FIG. 4b.

As shown, per step 452, a premises DVR 352 requests content from the content server 302. The DVR 352 also requests the DRM license from the DRM server 308 (at step 454). The DVR 352 utilizes the same DRM client as is used by the PMD 354 which will request the content. In this manner, both devices are able to access the content (via utilization of a DRM license obtained from the DRM server 308; as will be discussed below).

At step 456, the DRM server 308, in response to the request for the DRM license, determines whether the requesting DVR 352 is authorized/authenticated to receive access to the content, as well as the particular rights the DVR 352 (or its user) should be afforded. The DRM server 308, entitlements database 306, and content server 302 cooperate to determine the authentication/authorization of the DVR 352 (and/or a subscriber associated thereto). When it is determined that the device 352 is authorized/authenticated, the content is provided thereto from the content server 302 (via the DRM encryption entity 305; step 458). Additionally, the DRM server 308 generates a DRM license for delivery to the DVR 352 as well (step 458). This may be accomplished via utilization of a content key table 310 at the server 308. Authentication may occur, as discussed above, based on e.g., subscriber ID, MAC address, and/or other identifying information.

Next, per step 460, a PMD 354 requests content stored at the DVR 352. The DVR 352 determines whether the requested content is in an appropriate format to be utilized at the PMD 354, or whether processing is needed to convert the content to an appropriate format (step 462). If processing is needed, per step 464, the DVR 352 implements appropriate algorithms to transcode the content (such as from MPEG-2 to MPEG-4). In order to do so, however, the DVR 352 may first decrypt the content (using the content key within the DRM license), and then re-encrypt the content after translation (again using the content key within the DRM license). In other words, the content is transcrypted (step 466). In another embodiment, the transcryption step (step 466) may comprise causing the DVR 352 to, in a manner similar to the gateway 312 discussed above with respect to FIGS. 3a and 4a, receive content in a first encryption format (such as e.g., PowerKey) and decrypt/re-encrypt the content to a second format (such as e.g., DRM); see discussion above with respect to the aforementioned FIGS. 3a and 4a.

If no processing of the content is needed, or once processing is completed, per step 468, the requested content is provided to the PMD 354. The PMD 354, upon attempting to play the content, discovers that it is encrypted and thus the PMD 354 requests its own DRM license from the DRM server 308 (see step 470). The DRM server 308 then determines, at step 472, whether the PMD 354 is authorized/authenticated to receive access to the content. As discussed above, this may be accomplished via a content key table 310 at the server 308 and communication of the server 308 to various network entities (including e.g., an entitlements database 306, billing entity, account management entity, etc.). When it is determined that the PMD 354 is authorized to receive access to the content, an appropriate DRM license is provided thereto (step 474) and the PMD 354 may begin decryption and playback according to the rights transmitted in the DRM license.

Other Configurations

In another embodiment, the aforementioned network architectures of FIGS. 3a and 3b may be used to implement a "download" paradigm for legacy or newly developed CA, TD, and DRM software and cryptographic protection schemes. This allows the network operator, and even the third party content provider by proxy, to exert additional control on viewing, reproduction, and migration of content distributed over the network. For example, the apparatus and methods disclosed in co-owned U.S. patent application Ser. No. 11/584,208 filed on Oct. 20, 2006 and entitled "DOWNLOADABLE SECURITY AND PROTECTION METHODS AND APPARATUS", now issued as U.S. Pat. No. 8,520,850, which is incorporated herein by reference in its entirety, may be utilized. Specifically, the aforementioned network architectures of FIGS. 3a and 3b (network 300 and network 350) are configured to provide downloadable software modules (e.g., images), and an associated decryption key that facilitates decryption of the downloaded software images according to the herein described methods (see FIGS. 4a and 4b). In contrast to the previously described approaches of merely encrypting the content itself (such as via a DES or AES algorithm/symmetric or asymmetric key approach), the download of secure software images according to the present embodiment ensures security of the downloaded images and enables migration of protected content to other platforms in the user or client domain so as to extend the "trusted domain". In other words, the architecture of the present embodiment provides for a secure transmission of the DRM client software and related components, in addition to the secure delivery of the actual content.

The secure download approach of the present embodiment allows for ready implementation of future security upgrades or models, such as improved encryption algorithms and new DRM technologies. Additionally, utilization of a downloadable DRM module or image enables the present system to operate with both new and legacy CAS systems, including third party or retail devices (OEM devices). Devices that are connected to the operator's network utilize a prescribed process to ensure that the client device's download "host" has the correct software and cryptographic elements (e.g., keying) for operation on that network, regardless of whether the device comprises a lease or retail installation. This process advantageously enables client device hosts with inappropriate or no such software or cryptographic elements to acquire these components from the network securely.

The exemplary secure download architecture can also serve a variety of security environments and configurations ranging from the most basic (e.g., a low-end digital video service), to a high-end, multi-play environment with digital video, digital recording, multimedia, and data services. These environments can also include the ability to decrypt video delivered by the MSO, encrypt and decrypt content stored onto or retrieved from a hard drive (e.g., for PVR devices which require DRM), and decrypt and encrypt content delivered to or being sent from the TD.

The foregoing secure download embodiment may be further used to provide enhanced media provisioning capabilities. Media provisioning describes the process necessary to, inter alia, activate, configure, modify, and/or deactivate a CPE (e.g., downloadable conditional access (CA) system or "DCAS" host device) for operation within a content-based network. For example, the apparatus and methods of the co-owned U.S. patent application Ser. No. 11/657,828 filed on Jan. 24, 2007 and entitled "APPARATUS AND METHODS FOR PROVISIONING IN A DOWNLOAD-ENABLED SYSTEM", now issued as U.S. Pat. No. 8,621,540, which is incorporated herein by reference in its entirety, may be utilized. As discussed therein, a host device (including one or more entities associated therewith, such as the secure microprocessor (SM), is remotely managed by a Media Provisioning System (MPS) component of the network operator's larger provisioning system. The MPS (and the downloadable CA infrastructure described above) provides a secure, distributed system for the management of SM firmware configuration within download-capable host devices ("DCAS hosts").

In one exemplary embodiment, the MPS handles DCAS provisioning, and executes work flows to manage provisioning and configuration policy within the operator's network. The MPS signals these policies to an authentication agent or proxy (AP). The AP has responsibility for interacting with the CA system's personalization server (PS), an entity useful for the personalization of software/firmware images on individual host devices, and is also responsible for enforcing the aforementioned provisioning and configuration policies. In this exemplary embodiment, the MPS distributes information pertaining to the SM of each DCAS host device activated within the network to a corresponding authentication proxy (AP) within the network's conditional access infrastructure. Thus, the MPS to maintain the topological context of each SM, the SM's identifying information, and the SM's operationally desired software configuration.

In yet another embodiment, the aforementioned network architectures of FIGS. 3a and 3b may be used to enable content delivery across managed and unmanaged networks. For example, the apparatus and methods disclosed in co-owned, U.S. patent application Ser. No. 12/834,801 filed on Jul. 12, 2010, entitled "APPARATUS AND METHODS FOR CONTENT MANAGEMENT AND ACCOUNT LINKING ACROSS MULTIPLE CONTENT DELIVERY NETWORKS", and issued as U.S. Pat. No. 9,906,838 on Feb. 27, 2018, which is incorporated herein by reference in its entirety, may be utilized. As discussed therein, protected content is provided to subscribers of a managed (e.g., MSO) network via a content source accessible to the subscriber via the Internet or another external network.

In an exemplary embodiment, a user accesses a third party service provider (content source) website, and requests delivery of content (e.g., via on-demand type streaming, broadcast, high speed file download, etc.). If the particular content requested is protected content or content which is only accessible to certain types of subscribers, the service provider and/or MSO determines whether the requesting user is permitted to access the content (such as by using the entitlements database discussed above). The process by which it is determined whether a user may access content includes (i) authenticating the user as a subscriber to the MSO, and (ii) determining whether the subscriber's service/subscription level permits viewing of the requested content (and optionally one or more use restrictions). The process is advantageously agnostic to the underlying networks involved in both the request and content delivery processes.

In one variant, the user is authenticated by requiring him/her to establish a login identity and password, and/or assigning the user a GUID. The user's MAC address or IP address may also be used in this process. This unique information is stored at an MSO entity, and when the user requests content, the user must log into the MSO; the relevant information is retrieved and compared to information that the user has provided in their login. If valid login information is entered (i.e., the information provided matches the stored information for that user GUID), then a session is created between the MSO and user.

The aforementioned authentication at the MSO may be facilitated by various entities associated with the service provider. For instance, the user may first log in to a service provider's website, such as by establishing a login identity and password which are stored at the service provider's site. Once logged in, the service provider may forward requests to view content to an appropriate MSO and provide a platform for the user to log in to the MSO site.

In another variant, the service provider and MSO accounts for a particular user may be linked or federated. In other words, a trust relationship is established between the service provider and MSO, which is used to verify subscriber information. According to this embodiment, a given user will have MSO-specific information regarding its identity (such as login information for the MSO, GUID, etc.), and/or information regarding its subscription level and other service details stored at the service provider site. Messages received from the MSO representing permission for the user to access content may also be stored at the service provider site. The service provider may later reference this information when subsequent requests for content are made by the user for content, thereby providing faster and more efficient service.

In addition, the service provider is able to enforce security or rights management protection (e.g., DRM, encryption keys, etc.) on content authorized for delivery, by pre-positioning information enabling this protection (and specific to the requesting subscriber) at the service provider. Alternatively, the service provider may pre-configure the requested content based on one or more configuration parameters associated with the requesting device (e.g., codec support, DRM support, display capabilities, etc.). Information regarding a subscriber and/or devices rights to content is obtained from the DRM server.

Gateway Device

Figure 5A:
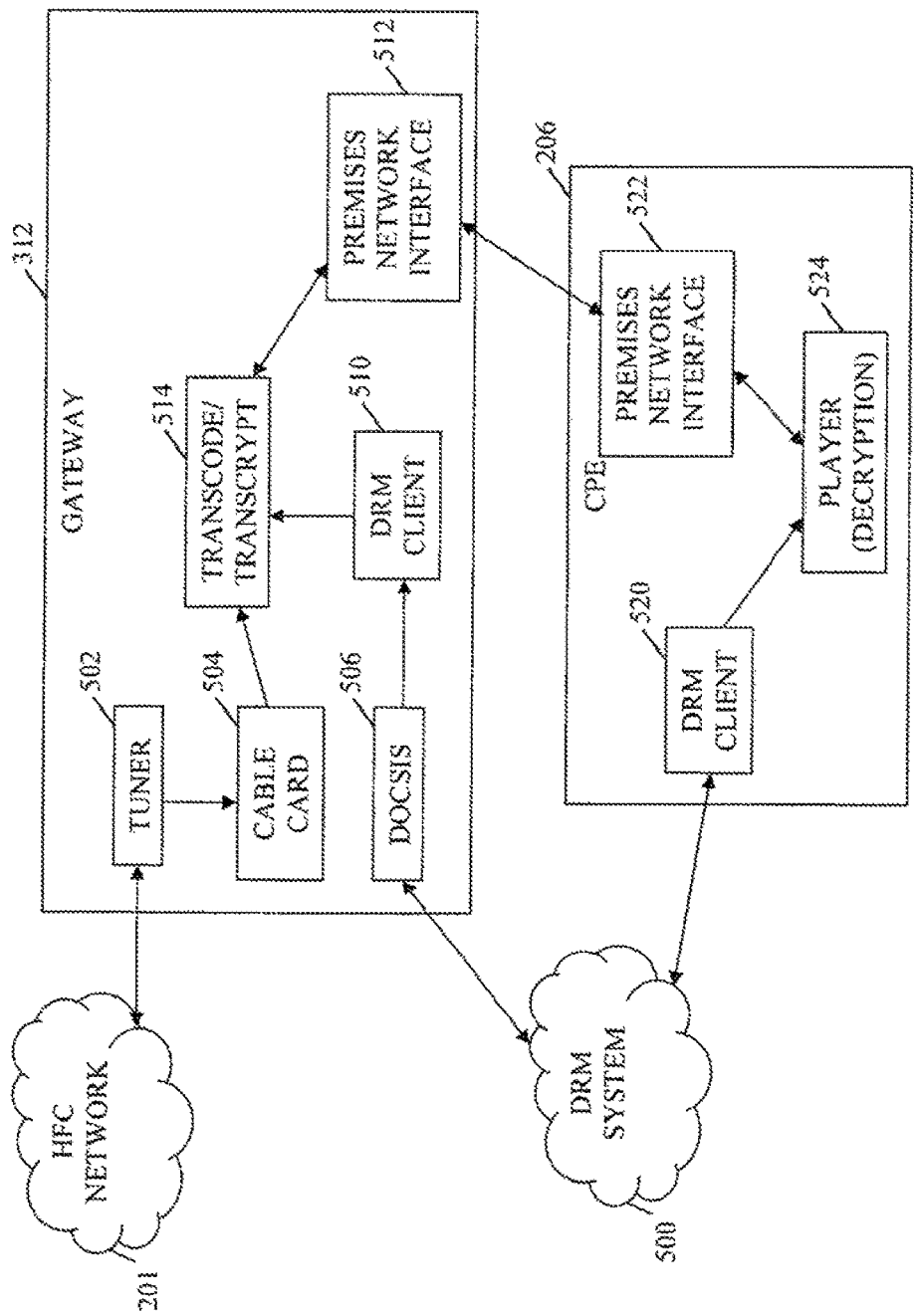
FIG. 5a is a functional block diagram illustrating an exemplary embodiment of a gateway apparatus and of a consumer premises apparatus (CPE) for the transfer of protected content according to the disclosure.

Referring now to FIG. 5a, an exemplary gateway device 312 for use with the systems and methods discussed in FIGS. 3a and 4a is illustrated. As shown, the device 312 generally comprises a premises network interface 512 configured to communicate with at least one CPE 206 via a respective premises network interface 522 thereof. The CPE 206 requests content from the gateway 312 via the aforementioned communication; the gateway 312 in turn requests the content from the network 502 (or receives the content as a part of a regularly scheduled broadcast).

In one embodiment, the gateway 312 comprises an RF front end for interface with the HFC network 201 of FIGS. 2-2d. The gateway 312 may further comprise various components such as e.g., digital processor(s), storage device (memory), and a plurality of interfaces (e.g., video/audio interfaces, IEEE-1394 "Firewire" or Thunderbolt™, USB, serial/parallel ports, etc.) for interface with other end-user apparatus such as televisions, personal electronics, computers, Wi-Fi or other network hubs/routers, etc., which are not illustrated herein for clarity. A tuner interface 502 of the gateway 312 is tuned to an appropriate QAM channel to receive the requested QAM content from the network 201. In one embodiment, the content is encrypted using the aforementioned PowerKey encryption scheme. A cable card 504 of the type discussed previously herein (e.g., Cable-Card) is used by the gateway 312 to decrypt the content.

A transcoder/transcrypter 514 is also disposed at the gateway 312. The transcoder/transcrypter 514 receives the decrypted content from the cable card 504 and transcodes the content to an appropriate format for any devices within the premises which request the content. In one embodiment, content is received in MPEG-2 and is transcoded to MPEG-4 by the transcoder/transcrypter 514 within the gateway apparatus 312 for delivery to a requesting CPE 206 capable of utilizing MPEG-4 content. In the instance where content is received in a format which the requesting device is capable of utilizing, the transcoding step may be omitted. In addition, the gateway uses a DRM client 510 running thereon to request, via a DOCSIS interface 506, a DRM license from a DRM system 500. The transcoder/transcrypter 514 uses a content key within the DRM license to transcrypt the received content from e.g., PowerKey to DRM.

The transcoded and transcrypted content is then provided to a requesting CPE 206 via the previously discussed communication between the gateway 312 premises network interface 512 and the CPE 206 premises network interface 522.

The CPE 206, once it receives the requested content from the gateway 312, begins playback of the content. However, in order to effect such playback, the CPE 206 requires a DRM license (to decrypt the content). Hence, the CPE 206 of the embodiment of FIG. 5a is configured to run a DRM client 520 thereon. The DRM client 520 of the CPE 206 is in the exemplary implementation the same DRM client 510 as that run on the gateway 312 (or at least has comparable capabilities). In this manner, the CPE 206 is able to decrypt content using the same content key which was used by the gateway 312 to encrypt the content.

It is further noted that, in one embodiment, the gateway 312 may comprise a converged premises device, such as for example that described in co-owned U.S. patent application Ser. No. 11/378,129 filed Mar. 16, 2006, and entitled "METHODS AND APPARATUS FOR CENTRALIZED CONTENT AND DATA DELIVERY", now issued as U.S. Pat. No. 8,347,341, which is incorporated herein by reference in its entirety. As discussed therein, the apparatus (i.e., gateway 312) may comprise a remotely manageable premises device that, inter alia, acts as a centralized client networking platform providing gateway services such as network management as well as traditional content and high-speed data delivery functions to a plurality of CPE 206 in communication therewith. This premises device may be used, for example, as a shared internet (e.g., Internet) connection for all devices in the premises via a cable modem or other such interface, sharing personal and DVR content such as video, music and photos (and any associated metadata) throughout the premises, and providing both a wired and wireless network in the home. Telephony services utilizing e.g., embedded multimedia terminal adapter (eMTA) and/or Wi-Fi architectures may also be provided via the device; these services can make use of the network operator's indigenous VoIP or comparable telephony capability if desired, thereby providing an even more unified service environment.

It is further appreciated that, via the gateway 312, a wired home network utilizing existing coaxial cable in the premises may also be created, using e.g., an Ethernet-to-coaxial bridge technology based on the MoCA specification. This allows existing devices and DVRs to connect and share content with the gateway 312, and also allows the network operator (e.g., MSO) to control and manage the premises coaxial network. In addition, the gateway 312 may be configured to be accessible via any remote device with internetworking (e.g., Internet) capability, thereby allowing content to be accessed by the user from outside the premises.

Still further, it is noted that the CPE 206 may comprise various other components including e.g., various processing layers (e.g., DOCSIS MAC or DAVIC OOB channel, MPEG, etc.) as well as media processors and other specialized SoC or ASIC devices. The CPE 206 may also comprise an integrated HD decoder, thereby relieving any connected monitors or other devices from the requirement of having such a decoder. These additional components and functionality are well known to those of ordinary skill in the cable and embedded system fields, and accordingly not described further herein.

It is also noted that, in order to perform a playback function (via the media player 524), the CPE 206 may also provided with an OCAP-compliant application and Java-based middleware which, inter alia, manages the operation of the device and applications running thereon (including the aforementioned DRM client 520 and other applications necessary for causing transcoding, transcryption, communication, etc). Alternatively, different middlewares (e.g., MHP, ARIB, or ACAP) may be used in place of the OCAP middleware discussed above.

It will be recognized by those of ordinary skill that myriad different device and software architectures may be used consistent with the selective enforcement functions of the present disclosure, the gateway 312 and CPE 206 devices of FIG. 5a being merely exemplary.

DVR

FIG. 5b illustrates an exemplary embodiment of a DVR 352 for use with the architectures and methods discussed in FIGS. 3b and 4b, respectively.

As shown in the diagram of FIG. 5b, the exemplary DVR 352 generally comprises a network interface 560 configured to receive content from an HFC network. In one embodiment, the interface comprises an RF tuner of the type discussed above with respect to the gateway 312 device of FIG. 5a. In a further embodiment, the DVR 352 may also include a CableCard for decryption of PowerKey encrypted content. Alternatively, the received content may comprise DRM encrypted content.

Content may be selected for delivery to the DVR 352 by a user thereof, or may be selected by a user of a remote device, such as a PMD 354, for delivery to and storage at the DVR 352. In another embodiment, content may be provided to the DVR 352 automatically, such as based on a broadcast thereof to all devices within a service node, or via a unicast (e.g., based on an identified tendency of a user to be interested in the content or content similar to that which is automatically delivered). For example, the methods and apparatus disclosed in co-owned, U.S. patent application Ser. No. 12/414,576, filed on Mar. 30, 2009 and entitled "RECOMMENDATION ENGINE APPARATUS AND METHODS", now issued as U.S. Pat. No. 9,215,423 which is incorporated herein by reference in its entirety, may be used in conjunction with the foregoing to cause content to be automatically stored at the DVR 352. As discussed therein, content targeted to a particular user (or group of users) within a content-based network, such as a cable television or satellite network is identified and recommended. Specifically, a mechanism is utilized to particularly select content to align with a user's preferences (the latter which the viewer need not enter manually). The content provided to the user is compiled from various distinct sources, including, inter alia, DVR, broadcasts, VOD systems, start over systems, etc. In addition, the provided mechanism may learn (and unlearn) the user's preferences and which content they are likely to enjoy based on actions taken with regard to previously provided (recommended) content.

The content received at the DVR 352 is processed at a transcoder/transcrypter 552. The transcoder/transcrypter 552 is configured to process the content received from the network 201 into a format and encryption scheme utilized by requesting PMD 354. As noted above, in one embodiment, the content is received in a format (e.g., MPEG-2, MPEG-4, etc.) which is compatible with a requesting PMD 354, hence no transcoding is necessary in that instance. However, if the content requires transcoding, the DVR 352 will do so by first decrypting the content using a content key retrieved from a DRM license. The DRM license is obtained via a request from the DRM client 554 of the DVR 352 to the DRM system 500 sent over a DOCSIS interface 550. Alternatively, or in addition, the content may be received having an appropriate DRM or other encryption scheme and therefore may not necessitate transcryption by the DVR 352.

The content is stored at a mass storage device 558 (e.g. HDD or the like). In one embodiment, the content is stored at the storage entity 558 in the format it is received and is only transcoded/transcrypted as necessary, such as when a request for the content from a PMD 354 is received. Alternatively, the DVR 352 may utilize information regarding the capabilities of PMD 354 registered thereto and preemptively transcode and/or transcrypt the content to one or more formats which are compatible with one or more PMD 354 prior to storage thereof at the HDD 558.

As shown, content is requested by the PMD 354 via communication of a DVR interface 562 thereof to a PMD interface 556 of the DVR 352. The requested content is also delivered over these interfaces. The communication may comprise a wired or wireless interface including e.g., FireWire (e.g., FW400, FW800, etc.), USB (e.g., USB2), Ethernet (e.g., 10/100, 10/100/1000 (Gigabit Ethernet), 10-Gig-E, etc.), Ethernet-to-coaxial bridge technology, MoCA, Wi-Fi (802.11), WiMAX (802.16), cellular (e.g., 3G, LTE/LTE-A/TD-LTE, GSM, etc.), Bluetooth, etc.

When the PMD 354 attempts to playback the content (via its media player 564), it is determined that a content key is needed to decrypt the content. Hence, as shown, the PMD 354 further comprises a DRM client 566 which is used to communicate with the DRM system 500 to obtain the DRM license. As discussed elsewhere herein, the various entities at the DRM system 500 and at the network 201 cooperate to determine appropriate rights of the user and/or requesting device to content; these are used to generate the DRM license. It is also noted that the DRM client 566 of the PMD 354 is the same as (or has similar functionality to) the DRM client 554 of the DVR 352. In this manner, the content key which is used to encrypt the content at the DVR 352 is the same content key received by the PMD 354 for decryption.

The illustrated DVR 352 and/or PMD 354 may include various other components which are not illustrated herein (for clarity). For example, the network interface 560 of the DVR 352 may comprise e.g., an OpenCable (OCAP)-compliant embedded system having an RF front end (including tuner and demodulator/decryptors) for interface with the HFC network 201 of FIGS. 2-2*d*. Additional digital processors, storage devices (memory), and interfaces (e.g., video/audio interfaces, Firewire or Thunderbolt™, USB, serial/parallel ports, etc.) may also be provided in the DVR 352 and/or PMD 354.

Other components which may be utilized within the DVR 352 and/or PMD 354 include various processing layers (e.g., DOCSIS MAC or DAVIC 00B channel, MPEG, etc.) as well as media processors and other specialized SoC or ASIC devices. The DVR 352 and/or PMD 354 may also comprise an integrated HD decoder.

In one variant, the client applications necessary for providing the foregoing functionalities of the DVR 352 and/or PMD 354 of FIG. 5*b* comprise OCAP-compliant applications which operate via Java-based middleware (including the aforementioned DRM clients, and other applications necessary for causing transcoding, transcryption, communication, etc.). It will be recognized by those of ordinary skill that myriad different device and software architectures may be used consistent with the selective enforcement functions of the present disclosure, the devices of FIG. 5*b* being merely exemplary. For example, different middlewares (e.g., MHP, ARIB, or ACAP) may be used.

In yet another embodiment, the foregoing functionality of the gateway 312 and/or DVR 342 may be implemented on a media bridging apparatus such as that disclosed in co-owned, U.S. patent application Ser. No. 12/480,597 filed on Jun. 8, 2009, entitled "MEDIA BRIDGE APPARATUS AND METHODS", and issued as U.S. Pat. No. 9,602,864 on Mar. 21, 2017, and incorporated herein by reference in its entirety. As discussed therein, the device (e.g., the gateway 312 and/or DVR 342) acts as a connection between a portable media device (PMD) and a user's home network. This bridging apparatus may be used, for example, to convert content stored on one client device (such as e.g., the PMD 354 or CPE 206) to a format capable of being presented on a user's set-top box or other client device. Control of the presentation is also provided by the bridging apparatus. For instance, in one embodiment, the apparatus enables a user to access and control playback of media from a first device via a user interface associated with a second device. The media bridging apparatus may also enable media content from a device within a premises network to be accessed via extant networks for distribution to any STB, PC, mobile device, or other PMD outside the premises network.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure herein.

While the above detailed description has shown, described, and pointed out novel features of the disclosure as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles of the disclosure. The scope of the disclosure should be determined with reference to the claims.

What is claimed is:

1. Computerized bridging apparatus configured to provide digitally rendered content to a computerized client device, the computerized bridging apparatus comprising:
    a first data interface configured to enable data communication between the computerized apparatus and a managed content delivery network;
    a second data interface configured to enable data communication with the computerized client device;
    digital processor apparatus in data communication with the first data interface and the second data interface; and
    storage apparatus in data communication with the digital processor apparatus, the storage apparatus comprising at least one computer program configured to, when executed on the digital processor apparatus:
        receive data representative of a request from at least one of the computerized client device for the digitally rendered content;
        cause generation and transmission of a data communication to the managed content delivery network via at least the first interface, the data communication configured to request at least the digitally rendered content;
        receive, at the computerized bridging apparatus and from a headend entity of the managed content delivery network, (i) the digitally rendered content, and (ii) a copy of cryptographic data relating to the digitally rendered content; and
        based on the received data representative of the request for the digitally rendered content:
            (i) decrypt the received digitally rendered content;
            (ii) re-encrypt the digitally rendered content using at least the received copy of the cryptographic data; and
            (iii) provide the re-encrypted digitally rendered content to the computerized client device via at least the second interface;
    wherein the cryptographic data is required by the computerized client device to de-crypt the re-encrypted digitally rendered content for playback thereof by the computerized client device; and
    wherein the cryptographic data is received by the computerized client device from a network entity of the managed content delivery network.

2. The computerized bridging apparatus of claim 1, wherein the at least one computer program is further configured to, when executed on the digital processor apparatus:
    transcode the digitally rendered content from a first encoding format to a second encoding format, the first encoding format comprising an Moving Pictures Experts Group (MPEG)-2 format, and the second encoding format comprising an MPEG-4 AVC (Advanced Video Codec) format.

3. The computerized bridging apparatus of claim 1, wherein the data communication configured to at least request the digitally rendered content is further configured to cause request for at least the cryptographic data, at least a portion of the data communication generated using at least a digital rights management (DRM) client application program operative to run on the digital processor apparatus.

4. The computerized bridging apparatus of claim 3, wherein the data communication configured to at least request the digitally rendered content and to cause request for at least the cryptographic data comprises: (i) a first request for the digitally rendered content from a first network entity of the managed content delivery network, and (ii) a second request for the cryptographic data from a second network entity of the managed content delivery network;
    wherein the first network entity comprises a content server; and
    wherein the second network entity comprises a digital rights management (DRM) server; and
    wherein the received copy of the cryptographic data comprises at least one content key associated with DRM license data.

5. The computerized bridging apparatus of claim 1, wherein the at least one computer program is further configured to, when executed:
    determine that the digitally rendered content is received from the managed content delivery network in a format that is incompatible with the computerized client device; and
    based at least in part on the determination, transcode the digitally rendered content from the first format to a second format compatible with the computerized client device prior to said re-encryption.

6. The computerized bridging apparatus of claim 1, wherein the digitally rendered content and the copy of cryptographic data are received from the managed content delivery network only upon authentication of the computerized bridging apparatus, the authentication based at least in part on a Media Access Control (MAC) address associated with the computerized bridging apparatus.

7. The computerized bridging apparatus of claim 1, wherein the at least one computer program is further configured to, when executed on the digital processor apparatus:
    store the received copy of the cryptographic data for use for subsequent requests for the digitally rendered content by other computerized client device associated with a subscriber account with which the computerized client device is associated, the subscriber account maintained by the managed content delivery network.

8. A computerized method for securely providing digitally rendered content to one or more computerized client devices associated with a content delivery network, the method comprising:
    receiving, at an intermediary computerized apparatus and from the one or more computerized client devices, data representative of a request for the digitally rendered content;

using at least a portion of the received data for requesting, and responsive to the requesting receiving, the digitally rendered content from a first entity of the content delivery network, the digitally rendered content received in a first encrypted format;

using at least a portion of the received data for requesting, and responsive to the requesting, receiving first cryptographic data from a second entity of the content delivery network, the requesting and receiving of the first cryptographic data being conducted at least via a digital rights management (DRM) client application run on the intermediary computerized apparatus;

utilizing at least second cryptographic data to decrypt the digitally rendered content in the first encrypted format;

utilizing at least the first cryptographic data to re-encrypt the digitally rendered content to a second encrypted format; and providing the digitally rendered content in the second encrypted format to the one or more computerized client devices;

wherein the second encrypted format necessitates the one or more computerized client devices to issue a request to the second entity, via a DRM client application configured to obtain third cryptographic data from the second entity that is the same as the first cryptographic data obtained the DRM client application run on the intermediary computerized apparatus, for the third cryptographic data in order to enable playback of the digitally rendered content at the one or more computerized client devices.

9. The method of claim 8, wherein:
the requesting the first cryptographic data from the second entity comprises requesting a first cryptographic data structure; and
the requesting the third cryptographic data from the second entity comprises requesting the first cryptographic data structure.

10. The method of claim 8, wherein:
the requesting the first cryptographic data from the second entity comprises requesting a first cryptographic data structure; and
the requesting the third cryptographic data from the second entity comprises requesting a third cryptographic data structure different in at least one respect than the first cryptographic data structure, the first cryptographic data structure comprising the first cryptographic data, the third cryptographic data structure comprising the third cryptographic data, the first and third cryptographic data being identical to each other.

11. The method of claim 8, further comprising:
based at least in part on capability data descriptive of the one or more computerized client devices, determining that the digitally rendered content received from of the content delivery network comprises a format that is not compatible with the one or more computerized client devices;
based at least on the determining, transcoding the digitally rendered content to a format compatible with the one or more computerized client devices; and
storing the digitally rendered content in the format compatible with the one or more computerized client devices at a storage entity associated with the content delivery network.

12. The method of claim 11, wherein:
the intermediary computerized apparatus comprises recording apparatus in data communication with a premises network associated with the one or more computerized client devices;
the first entity comprises a content server in direct or indirect communication with the recording apparatus;
the second entity comprises a DRM server; and
the receiving the first cryptographic data comprises receiving at least one content key within a DRM license.

13. The method of claim 12, wherein the receiving the content key within the DRM license comprises receiving from the DRM server after it has been determined at the DRM server that the recording apparatus is entitled to receive access thereto based at least in part on communication of the DRM server with one or more entitlement entities of the content delivery network.

14. The method of claim 12, further comprising providing to the content server data necessary for the content server to obtain appropriate authorization of the recording apparatus to access the digitally rendered content.

15. The method of claim 8, wherein the first encrypted format is in accordance with PowerKey content access standards.

16. Computer readable apparatus comprising a non-transitory storage medium, the non-transitory storage medium comprising at least one computer program having a plurality of instructions, the plurality of instructions configured to, when executed on a processing apparatus:
utilize a Digital Rights Management (DRM) client application on either a Digital Video Recorder (DVR) apparatus or a gateway apparatus in data communication with a premises network associated with a computerized client device, the DRM client application utilizing an identical protected content access algorithm as a DRM client application utilized by the computerized client device;
receive data representative of a request for digitally rendered content from the computerized client device;
receive the digitally rendered content from a content server of a managed content delivery network, the digitally rendered content being encrypted according to a first access control standard;
receive first content protection data from an entity of the managed content delivery network;
receive second content protection data from the entity of the managed content delivery network; and
based at least on determination of at least one of: (i) that a user associated with the computerized client device is authenticated to receive access to the digitally rendered content, and/or (ii) that the computerized client device is authenticated to receive access to the digitally rendered content:
decrypt the digitally rendered content via use of the first content protection data;
translate the digitally rendered content from a first encoding format to a second encoding format;
re-encrypt, via use of the second content protection data, the digitally rendered content according to a second access control standard; and
provide the re-encrypted digitally rendered content to the computerized client device;
wherein both the second content protection data and the DRM client application utilized by the computerized client device are required for decryption and playback of the digitally rendered content at the computerized client device; and wherein the second content protection data is received by the computerized client device from the entity of the managed content delivery network.

17. The computer readable apparatus of claim 16, wherein the second encoding format comprises a format compatible with capabilities of both the at least one computerized client device and at least one other client device in the premises network.

18. The computer readable apparatus of claim 16, wherein the first encoding format comprises a Moving Pictures Experts Group (MPEG)-2 format, and the second encoding format comprises an MPEG-4 or H.264 format.

19. The computer readable apparatus of claim 16, wherein:
the authentication is based at least in part on information unique to the user or the computerized client device and stored at an entity of the managed content delivery network; and
the unique information and the content protection data are pre-positioned at an entity of a non-managed internetwork for subsequent requests for other digitally rendered content originated from the computerized client device.

20. A computerized method of providing digital content to a computerized client device of a content delivery network irrespective of whether the computerized client device requests the digital content directly from the content delivery network or from a computerized intermediary device in data communication with the content delivery network, the method comprising:
providing to the computerized intermediary device the digital content rendered in a first protection format;
using the computerized intermediary device as a computerized proxy for a digital rights management (DRM) entity of the content delivery network, the computerized intermediary device configured for protecting the digital content, after receipt thereof from the content delivery network, in a second protection format, the second protection format comprising a format utilized by the DRM entity for content protection, the protecting the digital content comprising using a same content protection cryptographic data structure as used by the DRM entity, the protection cryptographic data structure unique to at least one of the computerized client device or a user thereof; and
utilizing a same DRM algorithm executed on both the computerized client device and the computerized intermediary device for controlling and/or changing usage rights and/or restrictions at any time up through playback of the digital content on the computerized client device, and irrespective of any transfer of the digital content between the computerized client device and the computerized intermediary device;
wherein the second protection format requires the computerized client device to obtain the content protection cryptographic data structure from the DRM entity of the content delivery network, the content protection cryptographic data structure being required to decrypt the digital content at the computerized client device.

21. The computerized bridging apparatus of claim 1, wherein the computerized bridging apparatus comprises Digital Video Recorder (DVR) device disposed in a premises of a user of the computerized client device.

22. The computer readable apparatus of claim 16, wherein:
the second content protection data comprises a DRM license received from a DRM server; and
the utilization of the identical protected content access algorithm enables an operator of the managed content delivery network to control or change usage rights or restrictions at any time up through playback of the digitally rendered content at the computerized client device, and irrespective of any transfer of the digital content between the computerized client device and the DVR apparatus or a gateway apparatus.

23. The computerized method of claim 20, wherein the same DRM algorithm executed on both the computerized client device and the computerized intermediary device comprises a DRM algorithm executed via respective computer program applications disposed on each the computerized client device and the computerized intermediary device, the respective computer program applications having common encryption or decryption capabilities.

* * * * *